(12) United States Patent
Bartholomew et al.

(10) Patent No.: US 7,835,344 B1
(45) Date of Patent: *Nov. 16, 2010

(54) TRANSPORT OF CALLER IDENTIFICATION INFORMATION THROUGH DIVERSE COMMUNICATION NETWORKS

(75) Inventors: Dale L. Bartholomew, Vienna, VA (US); Robert D. Farris, Sterling, VA (US); Stephen J. Flaherty, Upper Marlboro, MD (US)

(73) Assignee: Verizon Services Corp., Ashburn, VA (US)

( * ) Notice: Subject to any disclaimer, the term of this patent is extended or adjusted under 35 U.S.C. 154(b) by 1677 days.

This patent is subject to a terminal disclaimer.

(21) Appl. No.: 09/909,784

(22) Filed: Jul. 23, 2001

Related U.S. Application Data

(63) Continuation of application No. 08/822,602, filed on Mar. 19, 1997, now Pat. No. 6,292,479.

(51) Int. Cl.
*H04L 12/64* (2006.01)
(52) U.S. Cl. ...................... 370/352; 370/356
(58) Field of Classification Search ............. 370/259, 370/351–356, 373, 385, 389, 401, 466, 400; 379/93.23, 142, 201, 219
See application file for complete search history.

(56) References Cited

U.S. PATENT DOCUMENTS

| 4,054,756 A | 10/1977 | Comella et al. |
| 4,100,377 A | 7/1978 | Flanagan |
| 4,201,891 A | 5/1980 | Lawrence et al. |
| 4,375,097 A | 2/1983 | Ulug |
| 4,630,262 A | 12/1986 | Callens et al. |
| 4,652,700 A | 3/1987 | Matthews et al. |
| 4,653,045 A | 3/1987 | Stanley et al. |

(Continued)

FOREIGN PATENT DOCUMENTS

EP 0235257 9/1987

(Continued)

OTHER PUBLICATIONS

Weisser et al. "*The Intelligent Network and Forward-Looking Technology*", IEEE Comm Magazine, Dec. 1988, pp. 64-69.

(Continued)

*Primary Examiner*—Wing F Chan
*Assistant Examiner*—Duc T Duong

(57) ABSTRACT

A voice call is transported through diverse network paths including a switched telephone network and a wide area data internetwork, for example, the Internet. In routing the call, common channel signalling is used to provide data identifying a calling subscriber line from a calling PSTN, which information can then be transported through the separate data internetwork to the destination PSTN, at which the data is then extracted and sent to the called subscriber line while completing routing of the call. A route for the call is established at gateways connected to the data internetwork at the interface points with the calling and destination PSTNs, calling subscriber line information and dialed digit information being conveyed to the gateways. The destination end gateway initiates a call connection to the calling subscriber line via the destination PSTN to complete routing of the call, while supplying identification of the calling subscriber line in a form recognized as such by the called PSTN. The called party central office can then provide caller ID services.

24 Claims, 6 Drawing Sheets

U.S. PATENT DOCUMENTS

| | | |
|---|---|---|
| 4,679,190 A | 7/1987 | Dias et al. |
| 4,685,125 A | 8/1987 | Zave |
| 4,713,806 A | 12/1987 | Oberlander et al. |
| 4,718,005 A | 1/1988 | Feigenbaum et al. |
| 4,730,071 A | 3/1988 | Schoenthal |
| 4,741,820 A | 5/1988 | Coughlin |
| 4,747,130 A | 5/1988 | Ho |
| 4,765,924 A | 8/1988 | Inoue |
| 4,782,485 A | 11/1988 | Gollub |
| 4,821,034 A | 4/1989 | Anderson et al. |
| 4,827,500 A | 5/1989 | Binkerd et al. |
| 4,865,763 A | 9/1989 | Inoue |
| 4,872,157 A | 10/1989 | Hemmady et al. |
| 4,872,159 A | 10/1989 | Hemmady et al. |
| 4,872,160 A | 10/1989 | Hemmady et al. |
| 4,875,206 A | 10/1989 | Nichols et al. |
| 4,877,949 A | 10/1989 | Danielson |
| 4,882,476 A | 11/1989 | White |
| 4,893,302 A | 1/1990 | Hemmady et al. |
| 4,894,824 A | 1/1990 | Hemmady et al. |
| 4,899,333 A | 2/1990 | Roediger |
| 4,910,794 A | 3/1990 | Mahany |
| 4,922,486 A | 5/1990 | Lidinsky et al. |
| 4,933,931 A | 6/1990 | Kokubo |
| 4,942,574 A | 7/1990 | Zelle |
| 4,958,341 A | 9/1990 | Hemmady et al. |
| 4,979,206 A | 12/1990 | Padden et al. |
| 4,996,707 A | 2/1991 | O'Malley et al. |
| D315,573 S | 3/1991 | Schultz |
| 5,008,926 A | 4/1991 | Misholi |
| 5,009,337 A | 4/1991 | Bimbi |
| 5,012,511 A | 4/1991 | Hanle et al. |
| 5,019,699 A | 5/1991 | Koenck |
| 5,025,254 A | 6/1991 | Hess |
| 5,029,196 A | 7/1991 | Morganstein |
| 5,029,199 A | 7/1991 | Jones et al. |
| 5,031,098 A | 7/1991 | Miller |
| 5,052,020 A | 9/1991 | Koenck |
| 5,052,943 A | 10/1991 | Davis |
| 5,065,393 A | 11/1991 | Sibbitt et al. |
| 5,068,888 A | 11/1991 | Scherk et al. |
| 5,070,536 A | 12/1991 | Mahany |
| 5,098,877 A | 3/1992 | Coughlin |
| 5,107,492 A | 4/1992 | Roux et al. |
| 5,113,499 A | 5/1992 | Ankney et al. |
| 5,115,431 A | 5/1992 | Williams et al. |
| 5,115,495 A | 5/1992 | Tsuchiya et al. |
| 5,123,064 A | 6/1992 | Hacker |
| 5,144,282 A | 9/1992 | Sutterlin |
| 5,146,488 A | 9/1992 | Okada et al. |
| 5,157,390 A | 10/1992 | Yoshie et al. |
| 5,157,662 A | 10/1992 | Tadamura et al. |
| 5,159,592 A | 10/1992 | Perkins |
| 5,159,624 A | 10/1992 | Makita |
| 5,164,938 A | 11/1992 | Jurkevich et al. |
| 5,180,232 A | 1/1993 | Chadima |
| 5,193,110 A | 3/1993 | Jones et al. |
| 5,195,085 A | 3/1993 | Bertsch et al. |
| 5,195,183 A | 3/1993 | Miller |
| 5,202,817 A | 4/1993 | Koenck |
| 5,202,825 A | 4/1993 | Miller |
| 5,204,894 A | 4/1993 | Darden |
| 5,206,901 A | 4/1993 | Harlow et al. |
| 5,208,848 A | 5/1993 | Pula |
| 5,215,011 A | 6/1993 | Monney |
| 5,216,233 A | 6/1993 | Main |
| 5,218,187 A | 6/1993 | Koenck |
| 5,218,188 A | 6/1993 | Hanson |
| 5,223,699 A | 6/1993 | Flynn et al. |
| 5,223,820 A | 6/1993 | Sutterlin |
| 5,225,071 A | 7/1993 | Coughlin |
| 5,226,075 A | 7/1993 | Funk et al. |
| 5,227,614 A | 7/1993 | Danielson |
| 5,235,317 A | 8/1993 | Sutterlin |
| 5,241,588 A | 8/1993 | Babso et al. |
| 5,247,571 A | 9/1993 | Kay et al. |
| 5,254,971 A | 10/1993 | Sutterlin |
| 5,280,159 A | 1/1994 | Schultz et al. |
| 5,287,199 A | 2/1994 | Zoccolillo |
| 5,289,378 A | 2/1994 | Miller |
| 5,295,154 A | 3/1994 | Meier |
| 5,305,181 A | 4/1994 | Schultz |
| 5,308,966 A | 5/1994 | Danielson |
| 5,309,437 A | 5/1994 | Perlman et al. |
| 5,311,583 A | 5/1994 | Friedes et al. |
| 5,313,053 A | 5/1994 | Koenck |
| 5,317,566 A | 5/1994 | Joshi |
| 5,317,691 A | 5/1994 | Traeger |
| 5,318,719 A | 6/1994 | Hughes |
| 5,322,991 A | 6/1994 | Hanson |
| 5,325,421 A | 6/1994 | Hou et al. |
| 5,327,421 A | 7/1994 | Hiller et al. |
| 5,329,520 A | 7/1994 | Richardson |
| 5,329,578 A | 7/1994 | Brennan et al. |
| 5,331,580 A | 7/1994 | Miller |
| 5,341,374 A | 8/1994 | Lewen et al. |
| 5,345,446 A | 9/1994 | Hiller et al. |
| 5,346,611 A | 9/1994 | Coughlin |
| 5,349,497 A | 9/1994 | Hanson |
| 5,349,678 A | 9/1994 | Morris |
| 5,351,286 A | 9/1994 | Nici |
| 5,359,185 A | 10/1994 | Hanson |
| 5,365,524 A | 11/1994 | Hiller et al. |
| 5,365,546 A | 11/1994 | Koenck |
| 5,371,858 A | 12/1994 | Miller |
| 5,375,068 A | 12/1994 | Palmer et al. |
| 5,390,175 A | 2/1995 | Hiller et al. |
| 5,390,335 A | 2/1995 | Stephan et al. |
| 5,392,344 A | 2/1995 | Ash et al. |
| 5,392,402 A | 2/1995 | Robrock |
| 5,394,436 A | 2/1995 | Meier |
| 5,396,542 A | 3/1995 | Alger et al. |
| 5,402,478 A | 3/1995 | Hluchyj et al. |
| 5,406,557 A | 4/1995 | Baudoin |
| 5,408,237 A | 4/1995 | Patterson et al. |
| 5,408,382 A | 4/1995 | Schultz |
| 5,410,141 A | 4/1995 | Koenck |
| 5,410,754 A | 4/1995 | Klotzbach et al. |
| 5,418,844 A | 5/1995 | Morrisey et al. |
| 5,420,211 A | 5/1995 | Hughes |
| 5,422,882 A | 6/1995 | Hiller et al. |
| 5,422,940 A | 6/1995 | Endo et al. |
| 5,425,051 A | 6/1995 | Mahany |
| 5,425,085 A | 6/1995 | Weinberger et al. |
| 5,426,636 A | 6/1995 | Hiller et al. |
| 5,428,608 A | 6/1995 | Freeman et al. |
| 5,428,636 A | 6/1995 | Meier |
| 5,430,719 A | 7/1995 | Weisser, Jr. |
| 5,430,727 A | 7/1995 | Callon |
| 5,434,913 A | 7/1995 | Tung et al. |
| 5,436,963 A | 7/1995 | Fitzpatrick et al. |
| 5,440,563 A | 8/1995 | Isidoro et al. |
| 5,440,620 A | 8/1995 | Slusky |
| 5,448,633 A | 9/1995 | Jamaleddin et al. |
| 5,450,411 A | 9/1995 | Heil |
| 5,452,287 A | 9/1995 | DiCecco et al. |
| 5,452,289 A | 9/1995 | Sharma et al. |
| 5,452,350 A | 9/1995 | Reynolds et al. |
| 5,455,821 A | 10/1995 | Schaeffer et al. |
| 5,457,629 A | 10/1995 | Miller |
| 5,459,775 A | 10/1995 | Isono et al. |
| 5,461,611 A | 10/1995 | Drak et al. |
| 5,463,677 A | 10/1995 | Bash et al. |
| 5,465,207 A | 11/1995 | Boatwright |

| Patent No. | Date | Inventor(s) |
|---|---|---|
| 5,466,170 A | 11/1995 | Pavek |
| 5,468,947 A | 11/1995 | Danielson |
| 5,468,950 A | 11/1995 | Hanson |
| 5,469,496 A | 11/1995 | Emery et al. |
| 5,473,608 A | 12/1995 | Gagne et al. |
| 5,475,817 A | 12/1995 | Waldo et al. |
| 5,477,531 A | 12/1995 | McKee et al. |
| 5,478,581 A | 12/1995 | Christie |
| 5,483,549 A | 1/1996 | Weinberg et al. |
| 5,483,586 A | 1/1996 | Sussman |
| 5,483,676 A | 1/1996 | Mahany |
| 5,488,575 A | 1/1996 | Danielson |
| 5,490,247 A | 2/1996 | Tung et al. |
| 5,493,568 A | 2/1996 | Sampat et al. |
| 5,495,521 A | 2/1996 | Rangachar |
| 5,500,859 A | 3/1996 | Sharma et al. |
| 5,500,889 A | 3/1996 | Baker et al. |
| 5,504,746 A | 4/1996 | Meier |
| 5,511,111 A | 4/1996 | Serbetcioglu et al. |
| 5,513,127 A | 4/1996 | Gard et al. |
| 5,515,303 A | 5/1996 | Cargin, Jr. |
| 5,517,434 A | 5/1996 | Hanson |
| 5,520,796 A | 5/1996 | Chen et al. |
| 5,521,370 A | 5/1996 | Hanson |
| 5,521,719 A | 5/1996 | Yamada |
| 5,521,924 A | 5/1996 | Kakuma et al. |
| 5,524,137 A | 6/1996 | Rhee |
| 5,526,416 A | 6/1996 | Dezonno et al. |
| 5,528,539 A | 6/1996 | Ong |
| 5,530,744 A | 6/1996 | Charalambous et al. |
| 5,530,852 A | 6/1996 | Mesk et al. |
| 5,539,193 A | 7/1996 | Gibbs |
| 5,539,194 A | 7/1996 | Miller |
| 5,539,884 A | 7/1996 | Robrock, II |
| 5,539,886 A | 7/1996 | Aldred et al. |
| 5,541,398 A | 7/1996 | Hanson |
| 5,541,917 A | 7/1996 | Farris |
| 5,541,927 A | 7/1996 | Kristol et al. |
| 5,541,930 A | 7/1996 | Klingman |
| 5,544,010 A | 8/1996 | Schultz |
| 5,551,025 A | 8/1996 | O'Reilly et al. |
| 5,551,035 A | 8/1996 | Arnold et al. |
| 5,555,276 A | 9/1996 | Koenck |
| 5,559,068 A | 9/1996 | Chen |
| 5,559,721 A | 9/1996 | Ishii |
| 5,561,670 A | 10/1996 | Hoffert et al. |
| 5,563,882 A | 10/1996 | Bruno et al. |
| 5,568,645 A | 10/1996 | Morris |
| 5,576,529 A | 11/1996 | Koenck |
| 5,579,472 A | 11/1996 | Keywort et al. |
| 5,586,175 A | 12/1996 | Hogan |
| 5,586,177 A | 12/1996 | Farris et al. |
| 5,587,577 A | 12/1996 | Schultz |
| 5,590,127 A | 12/1996 | Bales et al. |
| 5,590,181 A | 12/1996 | Hogan |
| 5,590,346 A | 12/1996 | West |
| 5,594,717 A | 1/1997 | Watanabe et al. |
| 5,594,769 A | 1/1997 | Pellegrino et al. |
| 5,594,784 A | 1/1997 | Velius |
| 5,594,789 A | 1/1997 | Seazholtz et al. |
| 5,598,487 A | 1/1997 | Hacker |
| 5,602,456 A | 2/1997 | Cargin |
| 5,602,854 A | 2/1997 | Luse |
| 5,603,085 A | 2/1997 | Shedlo |
| 5,604,682 A | 2/1997 | McLaughlin et al. |
| 5,608,447 A | 3/1997 | Farry et al. |
| 5,608,786 A | 3/1997 | Gordon |
| 5,610,972 A | 3/1997 | Emery et al. |
| 5,610,976 A | 3/1997 | Uota et al. |
| 5,615,251 A | 3/1997 | Hogan |
| 5,617,343 A | 4/1997 | Danielson |
| 5,617,422 A | 4/1997 | Litzenberger et al. |
| 5,617,540 A | 4/1997 | Civanlar et al. |
| 5,619,555 A | 4/1997 | Fenton et al. |
| 5,619,557 A | 4/1997 | Van Berkum |
| 5,619,562 A | 4/1997 | Maurer et al. |
| 5,623,601 A | 4/1997 | Vu |
| 5,625,404 A | 4/1997 | Grady et al. |
| 5,625,407 A | 4/1997 | Biggs et al. |
| 5,625,677 A | 4/1997 | Feiertag et al. |
| 5,627,886 A | 5/1997 | Bowman |
| 5,633,916 A | 5/1997 | Goldhagen et al. |
| 5,636,216 A | 6/1997 | Fox et al. |
| 5,646,982 A | 7/1997 | Hogan et al. |
| 5,651,006 A | 7/1997 | Fujino et al. |
| 5,652,787 A | 7/1997 | O'Kelly |
| 5,654,957 A | 8/1997 | Koyama |
| 5,657,250 A | 8/1997 | Park et al. |
| 5,661,197 A | 8/1997 | Villiger et al. |
| 5,661,782 A | 8/1997 | Bartholomew et al. |
| 5,664,005 A | 9/1997 | Emery et al. |
| 5,664,102 A | 9/1997 | Faynberg |
| 5,668,857 A | 9/1997 | McHale |
| 5,669,062 A | 9/1997 | Olds et al. |
| 5,673,263 A | 9/1997 | Basso et al. |
| 5,675,507 A | 10/1997 | Bobo, II |
| 5,675,741 A | 10/1997 | Aggarwal et al. |
| 5,680,392 A | 10/1997 | Semaan |
| 5,687,167 A | 11/1997 | Bertin et al. |
| 5,689,550 A | 11/1997 | Garson et al. |
| 5,689,553 A | 11/1997 | Ahuja et al. |
| 5,692,039 A | 11/1997 | Brankley et al. |
| 5,694,463 A | 12/1997 | Christie et al. |
| 5,699,089 A | 12/1997 | Murray |
| 5,699,352 A | 12/1997 | Kriete et al. |
| 5,701,295 A | 12/1997 | Bales et al. |
| 5,701,465 A | 12/1997 | Baugher et al. |
| 5,703,935 A | 12/1997 | Raissyan et al. |
| 5,703,942 A | 12/1997 | Pinard et al. |
| 5,710,884 A | 1/1998 | Dedrick |
| 5,712,906 A | 1/1998 | Grady et al. |
| 5,712,908 A | 1/1998 | Brinkman et al. |
| 5,719,854 A | 2/1998 | Choudhury et al. |
| 5,724,355 A | 3/1998 | Bruno et al. |
| 5,724,406 A | 3/1998 | Juster |
| 5,724,412 A | 3/1998 | Srinivasan |
| 5,726,984 A | 3/1998 | Kubler et al. |
| 5,727,129 A | 3/1998 | Barrett et al. |
| 5,729,544 A | 3/1998 | Lev et al. |
| 5,729,599 A | 3/1998 | Plomondon et al. |
| 5,737,333 A | 4/1998 | Civanlar et al. |
| 5,740,164 A | 4/1998 | Liron |
| 5,744,533 A | 4/1998 | Iwamoto et al. |
| 5,748,468 A | 5/1998 | Notenboom et al. |
| 5,754,639 A | 5/1998 | Flockhart et al. |
| 5,754,641 A | 5/1998 | Voit et al. |
| 5,757,784 A | 5/1998 | Liebowitz et al. |
| 5,758,281 A | 5/1998 | Emery et al. |
| 5,761,294 A * | 6/1998 | Shaffer et al. ............... 379/230 |
| 5,764,741 A | 6/1998 | Barak |
| 5,774,530 A | 6/1998 | Montgomery et al. |
| 5,774,533 A | 6/1998 | Patel |
| 5,781,550 A | 7/1998 | Templin et al. |
| 5,781,624 A | 7/1998 | Mitra et al. |
| 5,784,617 A | 7/1998 | Greenstein et al. |
| 5,787,160 A | 7/1998 | Chaney et al. |
| 5,790,172 A | 8/1998 | Imanaka |
| 5,790,806 A | 8/1998 | Koperda |
| 5,796,790 A | 8/1998 | Brunner |
| 5,802,510 A | 9/1998 | Jones |
| 5,802,513 A | 9/1998 | Bowie, III |
| 5,805,682 A | 9/1998 | Voit et al. |
| 5,809,128 A * | 9/1998 | McMullin ............... 379/215.01 |
| 5,812,534 A | 9/1998 | Davis et al. |
| 5,812,834 A | 9/1998 | Suzuki |
| 5,812,865 A | 9/1998 | Theimer et al. |

| Patent | Date | Inventor |
|---|---|---|
| 5,818,921 A | 10/1998 | Vander Meiden et al. |
| 5,825,862 A | 10/1998 | Voit et al. |
| 5,825,869 A | 10/1998 | Brooks et al. |
| 5,826,268 A | 10/1998 | Schaefer et al. |
| 5,828,737 A | 10/1998 | Sawyer |
| 5,828,844 A | 10/1998 | Civanlar et al. |
| 5,832,197 A | 11/1998 | Houji |
| 5,835,723 A | 11/1998 | Andrews et al. |
| 5,838,682 A | 11/1998 | Dekelbaum et al. |
| 5,838,686 A | 11/1998 | Ozkan |
| 5,838,970 A | 11/1998 | Thomas |
| 5,856,364 A | 1/1999 | Martin |
| 5,864,604 A | 1/1999 | Moen et al. |
| 5,867,562 A | 2/1999 | Scherer |
| 5,878,126 A | 3/1999 | Velamuri et al. |
| 5,878,212 A | 3/1999 | Civanlar et al. |
| 5,881,134 A | 3/1999 | Foster et al. |
| 5,892,754 A | 4/1999 | Kompella et al. |
| 5,892,822 A | 4/1999 | Gottlieb et al. |
| 5,915,008 A | 6/1999 | Dulman |
| 5,915,012 A | 6/1999 | Miloslavsky |
| 5,933,425 A | 8/1999 | Iwata |
| 5,936,958 A | 8/1999 | Soumiya et al. |
| 5,940,616 A | 8/1999 | Wang |
| 5,944,795 A | 8/1999 | Civanlar |
| 5,946,386 A | 8/1999 | Rogers et al. |
| 5,953,322 A | 9/1999 | Kimball |
| 5,953,338 A | 9/1999 | Ma et al. |
| 5,953,504 A | 9/1999 | Sokal et al. |
| 5,953,651 A | 9/1999 | Lu et al. |
| 5,956,391 A | 9/1999 | Melen et al. |
| 5,956,482 A | 9/1999 | Agraharam et al. |
| 5,956,697 A | 9/1999 | Usui |
| 5,958,016 A | 9/1999 | Chang et al. |
| 5,959,998 A | 9/1999 | Takahashi et al. |
| 5,962,837 A | 10/1999 | Main et al. |
| 5,966,431 A | 10/1999 | Reiman et al. |
| 5,966,434 A | 10/1999 | Schafer et al. |
| 5,970,065 A | 10/1999 | Miloslavsky |
| 5,970,477 A | 10/1999 | Roden |
| 5,974,043 A | 10/1999 | Solomon |
| 5,974,052 A | 10/1999 | Johnson et al. |
| 5,978,840 A | 11/1999 | Nguyen et al. |
| 5,982,774 A * | 11/1999 | Foladare et al. ............. 370/352 |
| 5,987,108 A | 11/1999 | Jagadish et al. |
| 5,991,291 A | 11/1999 | Asai et al. |
| 5,991,292 A | 11/1999 | Focsaneanu et al. |
| 5,991,308 A | 11/1999 | Fuhrmann et al. |
| 5,995,503 A | 11/1999 | Crawley et al. |
| 5,995,606 A * | 11/1999 | Civanlar et al. ........ 379/207.13 |
| 5,995,608 A | 11/1999 | Detampel et al. |
| 5,999,524 A | 12/1999 | Corbalis et al. |
| 6,005,926 A | 12/1999 | Mashinsky |
| 6,006,253 A | 12/1999 | Kumar et al. |
| 6,011,975 A | 1/2000 | Emery et al. |
| 6,012,088 A | 1/2000 | Li et al. |
| 6,014,379 A | 1/2000 | White et al. |
| 6,014,687 A | 1/2000 | Watanabe et al. |
| 6,016,307 A | 1/2000 | Kaplan et al. |
| 6,018,360 A | 1/2000 | Stewart et al. |
| 6,018,567 A | 1/2000 | Dulman |
| 6,021,126 A | 2/2000 | White et al. |
| 6,021,263 A | 2/2000 | Kujoory et al. |
| 6,026,087 A | 2/2000 | Mirashrafi et al. |
| 6,028,858 A * | 2/2000 | Rivers et al. ................ 370/352 |
| 6,029,062 A | 2/2000 | Hanson |
| 6,035,028 A | 3/2000 | Ward et al. |
| 6,041,109 A | 3/2000 | Cardy et al. |
| 6,041,117 A | 3/2000 | Androski et al. |
| 6,044,081 A | 3/2000 | Bell et al. |
| 6,047,051 A | 4/2000 | Ginzboorg et al. |
| 6,047,326 A | 4/2000 | Kilkki |
| 6,049,545 A | 4/2000 | Stephenson et al. |
| 6,052,445 A | 4/2000 | Bashoura et al. |
| 6,052,450 A | 4/2000 | Allison et al. |
| 6,064,653 A | 5/2000 | Farris |
| 6,069,890 A | 5/2000 | White et al. |
| 6,075,783 A | 6/2000 | Voit |
| 6,078,582 A | 6/2000 | Curry et al. |
| 6,078,943 A | 6/2000 | Yu |
| 6,084,953 A | 7/2000 | Bardenheuer et al. |
| 6,088,431 A | 7/2000 | LaDue |
| 6,097,804 A | 8/2000 | Gilbert et al. |
| 6,098,094 A | 8/2000 | Barnhouse et al. |
| 6,101,182 A | 8/2000 | Sistanizadeh et al. |
| 6,104,704 A | 8/2000 | Buhler et al. |
| 6,115,458 A | 9/2000 | Taskett |
| 6,115,737 A | 9/2000 | Ely et al. |
| 6,118,936 A | 9/2000 | Lauer et al. |
| 6,122,255 A | 9/2000 | Bartholomew et al. |
| 6,125,113 A | 9/2000 | Farris et al. |
| 6,134,235 A | 10/2000 | Goldman et al. |
| 6,134,433 A | 10/2000 | Joong et al. |
| 6,134,530 A | 10/2000 | Bunting et al. |
| 6,137,792 A | 10/2000 | Jonas et al. |
| 6,137,869 A | 10/2000 | Voit et al. |
| 6,141,404 A | 10/2000 | Westerlage et al. |
| 6,141,412 A | 10/2000 | Smith et al. |
| 6,144,647 A | 11/2000 | Lopez-Torres |
| 6,144,661 A | 11/2000 | Katsube et al. |
| 6,144,667 A | 11/2000 | Doshi et al. |
| 6,154,445 A | 11/2000 | Farris et al. |
| 6,154,777 A | 11/2000 | Ebrahim |
| 6,157,621 A | 12/2000 | Brown et al. |
| 6,157,636 A | 12/2000 | Voit et al. |
| 6,157,648 A | 12/2000 | Voit et al. |
| 6,157,823 A | 12/2000 | Fougnies |
| 6,169,735 B1 | 1/2001 | Alle et al. |
| 6,175,618 B1 | 1/2001 | Shah et al. |
| 6,181,690 B1 | 1/2001 | Civanlar |
| 6,181,695 B1 | 1/2001 | Curry et al. |
| 6,185,198 B1 | 2/2001 | LaDue |
| 6,188,677 B1 | 2/2001 | Oyama et al. |
| 6,192,050 B1 | 2/2001 | Stovall |
| 6,195,425 B1 | 2/2001 | Farris et al. |
| 6,198,738 B1 | 3/2001 | Chang et al. |
| 6,205,139 B1 | 3/2001 | Voit |
| 6,212,162 B1 | 4/2001 | Horlin |
| 6,215,790 B1 | 4/2001 | Voit et al. |
| 6,222,919 B1 | 4/2001 | Hollatz et al. |
| 6,230,203 B1 | 5/2001 | Koperda et al. |
| 6,233,318 B1 | 5/2001 | Picard et al. |
| 6,233,604 B1 | 5/2001 | Van Horne et al. |
| 6,240,091 B1 | 5/2001 | Ginzboorg et al. |
| 6,243,373 B1 | 6/2001 | Turock |
| 6,243,374 B1 | 6/2001 | White |
| 6,252,869 B1 | 6/2001 | Silverman |
| 6,260,067 B1 | 7/2001 | Barnhouse et al. |
| 6,278,693 B1 | 8/2001 | Aldred et al. |
| 6,278,704 B1 | 8/2001 | Creamer et al. |
| 6,282,192 B1 | 8/2001 | Murphy et al. |
| 6,282,281 B1 | 8/2001 | Low |
| 6,282,284 B1 | 8/2001 | Dezonno et al. |
| 6,285,745 B1 | 9/2001 | Bartholomew et al. |
| 6,289,010 B1 | 9/2001 | Voit et al. |
| 6,292,478 B1 * | 9/2001 | Farris ......................... 370/352 |
| 6,292,479 B1 | 9/2001 | Bartholomew et al. |
| 6,292,481 B1 | 9/2001 | Voit et al. |
| 6,295,292 B1 | 9/2001 | Voit et al. |
| 6,298,120 B1 | 10/2001 | Civanlar et al. |
| 6,301,609 B1 | 10/2001 | Aravamudan et al. |
| 6,310,873 B1 | 10/2001 | Rainis et al. |
| 6,324,264 B1 | 11/2001 | Wiener et al. |
| 6,327,258 B1 * | 12/2001 | Deschaine et al. .......... 370/356 |
| 6,330,250 B1 | 12/2001 | Curry et al. |
| 6,332,023 B1 | 12/2001 | Porter et al. |

| Patent Number | Date | Name | | Patent Number | Date | Name |
|---|---|---|---|---|---|---|
| 6,335,927 B1 | 1/2002 | Elliott | | 2004/0093363 A1 | 5/2004 | Cargin |
| 6,363,065 B1 | 3/2002 | Thornton et al. | | 2004/0114567 A1 | 6/2004 | Kubler |
| 6,363,349 B1 | 3/2002 | Urs et al. | | 2004/0125753 A1 | 7/2004 | Mahany |
| 6,374,302 B1 | 4/2002 | Galasso et al. | | 2004/0131018 A1 | 7/2004 | Johnson et al. |
| 6,381,321 B1 | 4/2002 | Brown et al. | | 2004/0145775 A1 | 7/2004 | Kubler |
| 6,385,191 B1 * | 5/2002 | Coffman et al. ............ 370/352 | | 2004/0146020 A1 | 7/2004 | Kubler |
| 6,385,193 B1 | 5/2002 | Civanlar et al. | | 2004/0146037 A1 | 7/2004 | Kubler |
| 6,430,275 B1 | 8/2002 | Voit et al. | | 2004/0151150 A1 | 8/2004 | Kubler |
| 6,438,218 B1 | 8/2002 | Farris | | 2004/0151151 A1 | 8/2004 | Kubler |
| 6,449,259 B1 | 9/2002 | Allain et al. | | 2004/0151164 A1 | 8/2004 | Kubler |
| 6,449,356 B1 | 9/2002 | Dezonno | | 2004/0160912 A1 | 8/2004 | Kubler |
| 6,456,617 B1 | 9/2002 | Oda et al. | | 2004/0160913 A1 | 8/2004 | Kubler |
| 6,480,588 B1 | 11/2002 | Donovan | | 2004/0162889 A1 | 8/2004 | Morris |
| 6,493,353 B2 | 12/2002 | Kelly et al. | | 2004/0165573 A1 | 8/2004 | Kubler |
| 6,498,788 B1 | 12/2002 | Emilsson et al. | | 2004/0165793 A1 | 8/2004 | Hacker |
| 6,529,516 B1 | 3/2003 | Parzych | | 2004/0166895 A1 | 8/2004 | Koenck |
| 6,539,015 B2 | 3/2003 | Voit et al. | | 2004/0169583 A1 | 9/2004 | Meier |
| 6,542,497 B1 | 4/2003 | Curry | | 2004/0174841 A1 | 9/2004 | Kubler |
| 6,546,003 B1 | 4/2003 | Farris et al. | | 2004/0174842 A1 | 9/2004 | Kubler |
| 6,574,216 B1 | 6/2003 | Farris et al. | | 2004/0174843 A1 | 9/2004 | Kubler |
| 6,584,093 B1 | 6/2003 | Salama et al. | | 2004/0203834 A1 | 10/2004 | Mahany |
| 6,600,733 B2 | 7/2003 | Deng | | 2004/0246940 A1 | 12/2004 | Kubler |
| 6,600,735 B1 | 7/2003 | Iwama et al. | | 2004/0264442 A1 | 12/2004 | Kubler |
| 6,625,170 B1 | 9/2003 | Curry et al. | | 2005/0008002 A1 | 1/2005 | Kubler |
| 6,654,357 B1 | 11/2003 | Wiedeman | | 2005/0013266 A1 | 1/2005 | Kubler |
| 6,671,285 B1 | 12/2003 | Kirkby et al. | | 2005/0021713 A1 | 1/2005 | Dugan et al. |
| 6,678,718 B1 | 1/2004 | Khouri et al. | | 2005/0036467 A1 | 2/2005 | Kubler |
| 6,690,788 B1 | 2/2004 | Bauer et al. | | 2005/0078647 A1 | 4/2005 | Meier |
| 6,704,287 B1 | 3/2004 | Moharram | | 2005/0083872 A1 | 4/2005 | Kubler |
| 6,711,241 B1 | 3/2004 | White et al. | | 2005/0087603 A1 | 4/2005 | Mahany |
| 6,754,181 B1 | 6/2004 | Elliott et al. | | 2005/0191989 A1 | 9/2005 | Plush et al. |
| 6,760,429 B1 | 7/2004 | Hung et al. | | 2005/0195859 A1 | 9/2005 | Mahany |
| 6,775,519 B1 | 8/2004 | Wiedeman et al. | | 2005/0232213 A1 | 10/2005 | Meier |
| 6,810,033 B2 | 10/2004 | Derks | | 2005/0242192 A1 | 11/2005 | Koenck |
| 6,823,384 B1 | 11/2004 | Wilson et al. | | 2005/0254475 A1 | 11/2005 | Kubler |
| 6,870,827 B1 | 3/2005 | Voit et al. | | 2006/0007951 A1 | 1/2006 | Meier |
| 6,885,678 B2 | 4/2005 | Curry et al. | | 2006/0062240 A1 | 3/2006 | Meier |
| 6,910,632 B2 | 6/2005 | Koerck | | 2006/0131420 A1 | 6/2006 | Koenck |
| 6,925,054 B1 | 8/2005 | Atterton et al. | | 2006/0233161 A1 | 10/2006 | Koenck |
| 6,990,090 B2 | 1/2006 | Meier | | 2006/0251226 A1 | 11/2006 | Hogan |
| 7,012,898 B1 | 3/2006 | Farris et al. | | 2006/0268806 A1 | 11/2006 | Meier |
| 7,013,001 B1 | 3/2006 | Felger et al. | | 2006/0268807 A1 | 11/2006 | Meier |
| 7,079,534 B1 | 7/2006 | Medhat | | 2006/0274732 A1 | 12/2006 | Allen et al. |
| 7,085,362 B1 | 8/2006 | Christie | | 2006/0274735 A1 | 12/2006 | Allen et al. |
| 7,088,705 B2 | 8/2006 | Curry | | 2006/0291752 A1 | 12/2006 | Hacker |
| 7,092,379 B1 | 8/2006 | Singh et al. | | 2007/0001007 A1 | 1/2007 | Koenck |
| 7,120,319 B2 | 10/2006 | Danielson | | 2007/0007353 A1 | 1/2007 | Danielson |
| 7,149,208 B2 | 12/2006 | Mattaway | | 2007/0065046 A1 | 3/2007 | Hacker |
| 7,170,887 B2 | 1/2007 | Rosenberg | | 2007/0076687 A1 | 4/2007 | Low et al. |
| 7,206,592 B1 | 4/2007 | Gollnick | | 2007/0086445 A1 | 4/2007 | Mattaway |
| 7,236,575 B2 | 6/2007 | Kim et al. | | 2007/0121529 A1 | 5/2007 | Meier |
| 7,274,662 B1 | 9/2007 | Kalmanek, Jr. et al. | | 2007/0201515 A1 | 8/2007 | Lewis |
| 7,286,562 B1 | 10/2007 | Vargo et al. | | 2007/0206576 A1 | 9/2007 | Radulovic |
| 7,295,830 B2 | 11/2007 | Lippelt | | 2007/0263644 A1 | 11/2007 | Christie et al. |
| 7,359,972 B2 | 4/2008 | Jorgensen | | 2008/0013531 A1 | 1/2008 | Elliott et al. |
| 7,492,886 B1 | 2/2009 | Kalmanek | | 2008/0063161 A1 | 3/2008 | Joyce et al. |
| 7,502,339 B1 | 3/2009 | Pirkola et al. | | 2009/0022147 A1 | 1/2009 | Farris et al. |
| 2002/0083166 A1 | 6/2002 | Dugan et al. | | | | |
| 2002/0159461 A1 | 10/2002 | Hamamoto et al. | | FOREIGN PATENT DOCUMENTS | | |
| 2003/0078006 A1 | 4/2003 | Mahany | | | | |
| 2003/0169767 A1 | 5/2003 | Christie | | EP | 0335562 | 4/1989 |
| 2003/0112767 A1 | 6/2003 | Meier | | EP | 0365885 | 5/1990 |
| 2003/0189941 A1 | 10/2003 | Christie | | EP | 0381365 | 8/1990 |
| 2003/0198218 A1 | 10/2003 | Farris | | EP | 0559979 | 9/1993 |
| 2003/0198335 A1 | 10/2003 | Porter et al. | | EP | 0729281 | 2/1995 |
| 2004/0005046 A1 | 1/2004 | Deo et al. | | EP | 0767568 | 10/1995 |
| 2004/0018851 A1 | 1/2004 | Koenck | | EP | 0802690 | 4/1996 |
| 2004/0023651 A1 | 2/2004 | Gollnick | | EP | 0823809 | 2/1997 |
| 2004/0038717 A1 | 2/2004 | Mahany | | EP | 0781016 | 6/1997 |
| 2004/0039846 A1 | 2/2004 | Goss et al. | | EP | 0812089 | 12/1997 |
| 2004/0044667 A1 | 3/2004 | Mahany | | EP | 0722237 | 11/2007 |
| 2004/0073933 A1 | 4/2004 | Gollnick | | JP | 09-168051 | 6/1997 |
| 2004/0090952 A1 | 5/2004 | Kubler | | JP | 09-168063 | 6/1997 |

| | | |
|---|---|---|
| JP | 09-168064 | 6/1997 |
| JP | 09-168065 | 6/1997 |
| JP | 09-172459 | 6/1997 |
| JP | 09-172462 | 9/1997 |
| WO | 91/07839 | 5/1991 |
| WO | 94/11813 | 5/1994 |
| WO | 95/22221 | 8/1995 |
| WO | 95/29564 | 11/1995 |
| WO | 96/20448 | 7/1996 |
| WO | 96/20553 | 7/1996 |
| WO | 96/32800 | 10/1996 |
| WO | 96/34341 | 10/1996 |
| WO | 96/38018 | 11/1996 |
| WO | 97/14238 | 4/1997 |
| WO | 97/20424 | 6/1997 |
| WO | 97/22211 | 6/1997 |
| WO | 97/23078 | 6/1997 |
| WO | 97/28628 | 8/1997 |
| WO | 97/33412 | 9/1997 |
| WO | 98/12860 | 3/1998 |
| WO | 98/23080 | 5/1998 |
| WO | 98/34391 | 8/1998 |

OTHER PUBLICATIONS

Shah et al., "*Application of a New Network Concept for Faster Service Deployment*", International Conference on Comm. 88 Jun. 12-15, 1988, IEEE Comm, Soc. Conference, Record vol. 3, pp. 1327-1329.
Noerpel et al., "PACS: Personal Access Communications System—A Tutorial," IEEE Personal, Communications, Jun. 1996.
Varma et al., "Architecture for Interworking Data over PCS," IEEE Communications Magazine, Sep. 1996, 124-130.
Rosenberg et al., "SIP for Presence," 41st IETF, Apr. 3, 1998.
U.S. Appl. No. 60/023,891, filed Aug. 16, 1996.
Mills, M. (Mar. 8, 1996) "Freebie Heebie-Jeebies: New Long-Distance Calling Via the Internet Scares Small Phone Firms", The Washington Post, sec. F, pp. 1-2.
Hughes, D.T. (Feb. 21, 1995) "What Hath (Net) God Wrought?", The Journal [Fairfax, Virginia], sec. B, pp. 1-2.
Hughes, D.T. (May 28, 1996) "WebPhone Heading for Serious Telephony", The Journal, [Fairfax, Virginia], sec. A, p. 8.
Mills, M. (Jan. 23, 1996) "It's the Net's Best Thing to Being There: With Right Software, Computer Becomes Toll-Free Telephone", The Washington Post, sec. C, pp. 1,5.
Hughes, D.T. (Jan. 2, 1996) "Internet Phone Wars Heating Up: Companies Improve and Encourage Users to Test Products", The Journal, [Fairfax, Virginia], sec. A, p. 6.
Yang, C. (Feb. 12, 1995), "INETPhone: Telephone Services and Serves on Internet", RFC 1789 http://ds.internic.net/rfc/rfc/rfc1789.txt.
Kuehn, Richard A. (Jul. 1994) "The Voice of Technology", [Online text only] Credit World, vol. 82, No. 6, pp. 20-23.
Margulies, Edwin (Aug. 1996) Understanding the Voice-Enabled Internet, Flatiron Publishing, Inc., pp. 4-42 and 12-1 to 12-3.
C. Low, "The Internet Telephony Red Herring," Hewlett-Packard Laboratories, (May 15, 1996), pp. 1-15.
C. Low et al., WebIN-an architecture for fast deployment of IN-based personal services, Intelligent Network Workshop, 1996, IN '96, IEEE, (Apr. 21-24, 1996), vol. 2, 196+258.
Cady et al., "Mastering the Internet", Sybex Inc., Alameda, CA 1994, ISBN 94-69309.
Stevens, "TCPIP Illustrated", vol. 1, 1994, Addison-Wesley, pp. 12-122 and inside cover.
Keiser et al., "Digital Telephony and Network Integration", 1995, Chapman Hall, Second Edition, pp. 426-428. cited by examiner.
Chopra, Manvinder, Exploring Intelligent Peripheral Configuration, Universal Personal Communications, 1994. Record., 1994 Third Annual International Conference on, Sep. 27-Oct. 1, 1994, pp. 635-639.
Audio Messaging Interchange Specification (AMIS)—Analog Protocol, Version 1, Issue 2, Feb. 1992.

Jabbari, B., "Common Channel Signaling System No. 7 for ISDN and Intelligent Networks", Proceedings of the IEEE, vol. 79, No. 2, Feb., 1991, pp. 155-169.
"Supercharging the Web with Computer Telephony", CT and the 'Net, Mar. 1996.
"Audio and Video Over the Internet", CT and the 'Net, Computer Telephony, Mar. 1996.
Grigonis, Richard, "Computer Telephony Over The Internet", CT and the Net, Mar. 1996.
"Geek of the Week: Carl Malamud Interviews Phil Karn & Jun Murai", Internet Talk Radio, Mobile IP Networking, Nov. 1993.
McConnell, Brian, "How to Build an Internet PBX", Pacific Telephony Design, printed from http://www.phonezone.com/ip-phone.htm Mar. 5, 1997.
"Welcome to the Phone Zone", Pacific Telephony Design, http://www.phonezone.com/index2.htm, pp. 1-6.
Sears, Andrew, "Innovations in Internet Telephony: The Internet as The Competitor to The Pots Network", Innovations in Internet Telephony: The Internet as the Successor to the Pots Network, Feb. 28, 1996, pp. 1-6.
"Computer Telephony And The Internet", Stylus Innovation, http://www.stylus.com/hvml.htm.
Hedrick, C., "Routing Information Protocol", Jun. 1988, http://www.internic.net/rfc/rfc1058.txt, pp. 1-30.
Mills, D.L., "An Experimental Multiple-Path Routing Algorithm", Mar. 1986, http://www.internic.net.rfc/rfc981.txt, pp. 1-20.
Lougheed et al., "A Border Gateway Protocol (BGP)", Jun. 1990, http://www.internic.net/rfc/rfc1163.txt, pp. 1-26.
S. Deering, "Host Extensions for IP Multicasting", Aug. 1989, http://www.internic.net/rfc/rfc1112.txt, pp. 1-16.
Waitzman et al., "Distance Vector Multicast Routing Protocol", Nov. 1988, http://www.internic.net/rfc/rfc1075.txt, pp. 1-22.
Hinden et al., "The DARPA Internet Gateway", Sep. 1982, http://www.internic.net/rfc/rfc823.txt, pp. 1-41.
"VocalTec's Telephony Gateway—The Ultimate Internet Telephony Solution?," computer Telephony Magazine, Sep. 1996.
"A Call to Phones," Wired Magazine, Issue 4.03, http://www.wired.com/wired/archive/4.03/updata.html (Mar. 1996).
Mascoli, Cicchetti & Listanti, "Alternative Scenarios for Data Applications Via Internet-Mobile and DECT-ATM Interworkin," 4th IEEE International Conference on Universal Personal Communications, pp. 788-792, Nov. 6-10, 1995 published Apr. 1995.
Blackwell et al. "Secure Short-Cut Routing for Mobile IP," USENIX Summary 1994 Technical Conferences, Jun. 6-10, 1994.
Okada et al. "Mobile Communication Using PHS [Personal Handy Phone System] Communications Server," National Technical Report, vol. 42, No. 1, pp. 46-54 (Feb. 1996).
Sattler, Michael, "Nautilus Voice Encryption," May 10, 1995.
Chernov, Andrey A. "SpeakFreely" software, Apr. 18, 1996.
"Netspeak Corporation Introduces Webphone, Industry's First Internet-Based Telephony Solution for Business Users," PC Forum, Mar. 18, 1996.
"Free World Dialup Beta 2.0a Client," Feb. 12, 1996.
Kahane et al., "VocalTec IP Forum Contribution", VocalTec Inc., Seattle, WA, Jan. 15, 1997.
Handley et al., "SIP: Session Initiation Protocol", Internet Engineering Task Force, Internet Draft, Jul. 31, 1997, draft-ietf-mmusic-sip-03.txt, Jul. 31, 1997.
"Internet Telephony for Dummies" 2nd Edition, Chapters 14-16, 1997.
Kahane et al., "Call Management Agent System Specification" VoIP Forum Technical Committee, Aug. 14, 199.
IMTC Voice over IP Forum Service Interoperability Implementation Agreement, Draft 0.91, Document VoIP-008, Jan. 13, 1997.
Sebestyn, I., ITU Telecommunication Standardization Sector, Study Group 15, Q;2&3/15 Rapporteur Meeting, Document AVC-1086, v1, Dec. 5, 1996.
Oppen et al., "The Clearinghouse: A Decentralized Agent for Locating Named Objects in a Distributed Environment", ACM Transactions on Office Information Systems, vol. 1, No. 3, Jul. 1983, pp. 230-253.
Noerpel et al., "PACS: Personal Access Communications System—A Tutorial," IEEE Personal Communications, Jun. 1996.

Varma et al., "Architecture for Interworking Data over PCS," IEEE Communications Magazine, Sep. 1996, 124-130.
Rosenberg et al., "SIP for Presence," 41st IETF, Apr. 3, 1998.
U.S. Provisional Patent Appl. No. 60/023,891, filed Aug. 16, 1996.
Mills, M. (Mar. 8, 1996) "Freebie-Heebie-Jeebies: New Long-Distance Calling Via the Internet Scares Small Phone Firms", The Washington Post, sec. F, pp. 1-2.
Hughes, D.T. (Feb. 21, 1995) "What Hath (Net) God Wrought?", The Journal [Fairfax, Virginia], sec. B, pp. 1-2.
Hughes, D.T. (May 28, 1996) "WebPhone Heading for Serious telephony", The Journal, [Fairfax, Virginia], sec. A, p. 8.
Mills, M. (Jan. 23, 1996) "It's the Net's Best Thing to Being There: With Right Software, Computer Becomes Toll-Free Telephone", The Washington Post, sec. C, pp. 1,5.
Hughes, D.T. (Jan, 2, 1996) "Internet Phone Wars Heating Up: Companies Improve and Encourage Users to Test Products", The Journal, [Fairfax, Virginia], sec. A, p. 6.
Yang, C. (Feb. 12, 1995), "INETPhone: Telephone Services and Serves on Internet", RFC 1789 http://ds.internic.net/rfc/rfc/rfc1789.txt.
Kuehn, Richard A. (Jul. 1994) "The Vocie of Technology", [Online text only] Credit World, vol. 82, No. 6, pp. 20-23.
Margulies, Edwin (Aug. 1996) Understanding the Voice-Enabled Internet, Flatiron Publishing, Inc., pp. 4-42 and 12-1 to 12-3.
C. Low, "The Internet Telephony Red Herring," Hewlett-Packard Laboratories, (May 15, 1996), pp. 1-15.
C. Low et al., WebIN-an architecture for fast deployment on IN-based personal services, Intelligent Network Workshop, 1996, IN'96, IEEE, (Apr. 21-24, 1996), vol. 2, 196+258.
Cady et al., "Mastering the Internet", Sybex Inc., Alameda, CA, 1994, ISBN 94-69309.
Stevens, "TCPIP Illustrated", vol. 1, 1994, Addison-Wesley, pp. 12-122 and inside cover.
Keiser et al., "Digital Telephony and Network Integration", 1995, Chapman Hall, Second Edition, pp. 426-428. cited by examiner.
Chopra, Manvinder, Exploring Intelligent Peripheral Configuration, Universal Personal Communications, 1994. Record., 1994 Third Annual International Conference on, Sep. 27-Oct. 1, 1994, pp. 635-639.
Audio Messaging Interchange Specification (AMIS)—Analog Protocol, Version 1, Issue 2, Feb. 1992.
Jabbari, B., "Common Channel Signaling System No. 7 for ISDN and Intelligent Networks", Proceedings of the IEEE, vol. 79, No. 2, Feb. 1991, pp. 155-169.
"Supercharging the Web with Computer Telephony", CT and the 'Net, Mar. 1996.
"Audio and Video Over the Internet", CT and the 'Net, Computer Telephony, Mar. 1996.
Grigonis, Richard, "Computer Telephony Over The Internet", CT and the Net, Mar. 1996.
"Geek of The Week: Carl Malamud Interviews Phil Karn & Jun Murai", Internet Talk Radio, Mobile IP Networking, Nov. 1993.
McConnell, Brian, "How to Build an Internet PBX", Pacific Telephony Design, printed from http://www.phonezone.com/ip-phone.htm Mar. 5, 1997.
"Welcome to the Phone Zone", Pacific Telephony Design, http://www.phonezone.com/index2.htm, pp. 1-6, 1997.
Sears, Andrew, "Innovations in Internet Telephony: The Internet as The Competitor to The Pots Network", Innovations in Internet Telephony: The Internet as the Successor to the Pots Network, Feb. 28, 1996, pp. 1-6.
"Computer Telephony And The Internet", Stylus Innovation, http://www.stylus.com/hvml.htm, 1996.
Hedrick, C., "Routing Information Protocol", Jun. 1988, http://www.internic.net/rfc/rfc1058.txt, pp. 1-30.
Mills, D.L., "An Experimental Multiple-Path Routing Algorithm", Mar. 1986, http://www.internic.net/rfc/rfc981.txt, pp. 1-20.
Lougheed et al., "A Border Gateway Protocol (BGP)", Jun. 1990, http://www.internic.net.rfc/rfc1163.txt, pp. 1-26.
S. Deering, "Host Extensions for IP Multicasting", Aug. 1989, http://www.internic.net/rfc/rfc1112.txt, pp. 1-16.
Waitzman et al., "Distance Vector Multicast Routing Protocol", Nov. 1988, http://www.internic.net/rfc/rfc1075.txt, pp. 1-22.

Hinden et al., "The DARPA Internet Gateway", Sep. 1982, http://www.internic.net.rfc.rfc823.txt, pp. 1-41.
"VocalTec's Telephony Gateway—The Ultimate Internet Telephony Solution?," Computer Telephony Magazine, Sep. 1996.
"A Call to Phones," Wired Magazine, Issue 4.03, http://www.wired.com/wired/archive/4.03/updata.html (Mar. 1996).
Mascoli, Cicchetti & Listanti, "Alternative Scenarios for Data Applications Via Internet-Mobile and DECT-ATM Interworkin," 4th IEEE International Conference on Universal Personal Communications, pp. 788-792, Nov. 6-10, 1995 published Apr. 1995.
Blackwell et al. "Secure Short-Cut Routing for Mobile IP," USENIX Summary 1994 Technical Conferences, Jun. 6-10, 1994.
Okada et al. "Mobile Communication Using PHS [Personal Handy Phone System] Communications Server," National Technical Report, vol. 42, No. 1, pp. 46-54 (Feb. 1996).
Sattler, Michael, "Nautilus Voice Encryption," May 10, 1995.
Chernov, Andrey A. "SpeakFreely" software, Apr. 18, 1996.
"Netspeak Corporation Introduces Webphone, Industry's First Internet-Based Telephony Solution for Business Users," PC Forum, Mar. 18, 1996.
"Free World Dialup Beta 2.0a Client," Feb. 12, 1996.
Kahane et al., "VocalTec IP Forum Contribution", VocalTec Inc., Seattle, WA, Jan. 15, 1997.
Handley et al., "SIP: Session Initiation Protocol", Internet Engineering Task Force, Internet Draft, Jul. 31, 1997, draft-ietf-mmusic-sip-03.txt, Jul. 31, 1997.
"Internet Telephony for Dummies" 2nd Edition, Chapters 14-16, 1997.
Kahane et al., "Call Management Agent System Specification" VoIP Forum Technical Committee, Aug. 14, 1997.
IMTC Voice over IP Forum Service Interoperability Implementation Agreement, Draft 0.91, Document VoIP-008, Jan. 13, 1997.
Sebestyn, I., ITU Telecommunication Standardization Sector, Study Group 15, Q;2&3/15 Rapporteur Meeting, Document AVC-1086, v1, Dec. 5, 1996.
Oppen et al., "The Clearinghouse: A Decentralized Agent for Locating Named Objects in a Distributed Environment", ACM Transactions on Office Information Systems, vol. 1, No. 3, Jul. 1983, pp. 230-253.
"Camelot Announces Internet Voice Communication Technology Breakthrough", HighBeamTM Encyclopedia, From: PR Newswire, http://www.encyclopedia.com/doc/1G1-16452259.html?Q=Caml, Feb. 13, 1995, 2 pages.
1979 Annual Technical Report, "A Research Program in Computer Technology", Oct. 1978- Sep. 1979, Prepared for the Defense Advanced Research Projects Agency, University of Southern California, ISI-SR-80-17.
Cohen et al., "A Network Voice Protocol NVP-11", Lincoln Laboratory Massachsetts Institue of Technology, Apr. 1, 1981, ISI/RR-83-23.
1982 Annual Technical Report, "A Research Program in Computer Technology", Jul. 1981-Jun. 1982, University of Southern California, ISI-SR-83-23.
Annual Report to the Defense Communications Agency, "Network Speech Systems Technology Program", Massachusetts Institute of Technology Lincoln Laboratory, Oct. 1, 1980-Sep. 30, 1981, issued Feb. 4, 1982.
Heggestad et al., "Voice and Data Communication Experiments on a Wideband Satellite/Terrestrial Internetwork System", IEEE International Conference on Communications, Integrating Communication for World Progress, Jun. 19-22, 1983.
Annual Report to the Defense Communications Agency, "Defense Switched Network Technology and Experiments Technology", Massachusetts Institute of Technology Lincoln Laboratory, Oct. 1, 1981- Sep. 30, 1982, issued Feb. 5, 1983.
Meritt, "Providing Telephone Line Access to a Packet Voice Network", University of California, Feb. 1983, ISI/RR-83-107.
Weinstein, "The Experimental Integrated Switched Networks—A System Level Network Text Facility", Proceedings of 1983 IEE Military Communications Conference, Washington, DC, Oct. 31, 1983-Nov. 2, 1983.

Cesner et al., "Wideband Communications", 1984 Annual Technical Report, University of Southern California, ISI/SR-85-150, Jul. 1983-Jun. 1984.

Annual Report to the Defense Communications Agency, "Defense Switched Network Technology and Experiments Technology", Massachusetts Institute of Technology Lincoln Laboratory, Oct. 1, 1982-Sep. 30, 1983, issued Feb. 29, 1984.

Gross, "Proceedings of the Oct. 15-17, 1988 Joint Meeting of the Internet Engineering and Internet Architecture Task Forces", Fourth IETF, The Mitre Corporation.

Corley, "Bellsouth Trail of Wideband Packet Technology", Bellsouth Services, 1990 IEEE, CH2829-0/90/0000-1000.

Inoue et al., "Evolution Scenarion of Broadband Services Based on Granulated Broadband Network Concept", IEEE Region 10 Conference, Tencon 92, Nov. 11-13, 1992.

Inoue et al., "Granulated Broadband Network Applicable to B-ISDN and PSTN Services", IEEE Journal on Selected Areas in Communications, vol. 10, No. 9, Dec. 1992.

Cerf et al., "A Protocol for Packet Network Intercommunication", IEEE Transactions on Communications, No. 8, May 1974.

Cole, "Dialing in the WB Network", Information Sciences Institute University of Southern California, Dialing-Cole.83, Apr. 30, 1981.

Hapgood, "Dialing Without Dollars", Jul. 1995, vol. 17, No. 4, pp.18, Journal Code, INO.

Yang, "INETPhone: Telephone Services and Servers on the Internet", Network Working Group, RFC 1798, Apr. 1995, http://ds.intemic.net/rfc/rfc1798.txt.

Chen et al., "Integrated Voice/Data Switching", IEEE Communication Magazine, Jun. 1988, vol. 26, No. 6.

Frezza, "The Internet Phone is Poised to Conquer", Communications Week, Dec. 11, 1995, http://techweb.cmp.com/cw/current.

"Internet Access: Internet Phone-to-Phone Technology Now a Reality . . .", EDGE Publishing, Aug. 12, 1996.

"Internet Phone Saves 50% on Long Distance", 411 Newsletter, Aug. 5, 1996, vol. 17, No. 15, United Communications Group.

"Internet Phone Calls are Cheap but Limited", New Media Markets, Feb. 23, 1995, Financial Times Business Information, Ltd., ISSN:0265-4717.

"Internet Telephony Seems to be Evolving East, But is There Anyone on the Line?", Computergram International, Aug. 19, 1996, No. 2980, ISSN: 0268-716X.

"Internet's International Phone Calls are Cheap But Limited", Telecom Markets, Financial Times Business Information ID, Mar. 2, 1995, ISSN: 0267-1484.

Mills, The Washington Post, "Phone Service Via the Internet May Slash Rates", Aug. 11, 1996.

Sears, "The Effect of Internet Telephone of the Long Distance Voice Market", Jan. 14, 1995.

National Technical Information Service, Wideband Integrated Voice/Data Technology, ADA132284, Mar. 31, 1983, Massachusetts Inst. Of Tech., Lexington, Lincoln Lab.

Detreville et al., "A Distributed Experimental Communications System", Advances in Local Area Networks, IEEE Press, 1987.

Borden et al., "Integration of Real-Time Services in an IP-ATM Network", Internet RFC/STD/FYI/BCP ARchives, Aug. 1995.

Laubach, "Classical IP and ARP over ATM" Hewlett-Packard Laboratories, Jan. 1994, http://www.faqs.org/rfc/rfc1577.txt.

Comer, "Internetworking with TCP/IP", vol. 1, Principles, Protocols, and Architecture, Department of Computer Sciences, 1995.

Perez et al., "ATM Signaling for IP Over ATM", Network Working Group, RFC 1765, Feb. 1995, http:/www.ietf.org/rfc/rfc1765.txt.

Imielinski, Tomasz, et al., "Mobile Wireless Computing: Solutions and Challenges in Data Management," Department of Computer Science, Rutgers University, downloaded, Oct. 22, 2008.

Balmer, R., et al., "A Concept for RSVP Over DiffServ," Institute of Computer Science and Applied Mathematics, University of Berne, Switzerland, http://www.iam.unibe.ch/~rvs, pp. 412-417, IEEE, May 2000.

Ziegler, Jr., K., "A Distributed Information System Study," IBM SYST J, vol. 18, No. 3, pp. 374-401, 1979.

Blake, S., et al., "An Architecture for Differentiated Services," Network Working Group, pp. 1-36, Dec. 1998.

Walters, Rob, "Computer Telephony Integration," Second Edition, Artech House, 1999.

IMTC Voice over IP Forum Service Interoperability Implementation Agreement, Draft 0.91, IMTC Voice over IP Forum Technical Committee, Vol. P97-008, Jan. 13, 1997.

Braden, R., et al., "Integrated Services in the Internet Architecture: an Overview," Network Working Group, pp. 1-28, Jul. 1994.

Braun, Torsten, "Internet Protocols for Multimedia Communications," Part II: Resource Reservation, Transport, and Application Protocols, IEEE MultiMedia, pp. 74-82, Oct.-Dec. 1997.

Black, Uyless D., "Internet Telephony Call Processing Protocols," Prentice Hall PTR, www.phptr.com, 2001.

Briere, Daniel D., et al., "Internet Telephony for Dummies," 2nd Edition, IDG Books Worlwide, Inc., 1997.

Vin, Harrick M., et al., "Multimedia Conferencing in the Etherphone Environment," Xerox Palo Alto Research Center, IEEE, pp. 69-79, Oct. 1991.

Detti, Andrea, et al., "Supporting RSVP in a Differentiated Service Domain: an Architectural Framework and a Scalability Analysis," http://www-st.inf.tu-dresden.de/elisa/, downloaded, Oct. 27, 2008.

Bernet, Yoram, "The Complementary Roles of RSVP and Differentiated Services in the Full-Service QoS Network," QoS Mechanisms, Microsoft, downloaded, Oct. 27, 2008.

Herzog, S., et al., "COPS Usage for RSVP," Network Working Group, pp. 1-15, Jan. 2000.

Sebestyen, Istvan, "What is the position of Q.2, 0.3/15 on Internet Telephony for the IMTC—VoIP Forum Meeting in Seattle," ITU Telecommunication Standardization Sector, Study Group 15, pp. 1-5, Dec. 5, 1996.

Daniele, M., et al., "Textual Conventions for Internet Network Addresses," Nework Working Group, pp. 1-16, Jun. 2000.

Handley, M., et al., "SIP: Session Initiation Protocol," Internet Engineering Task Force, pp. 1-30, Dec. 2, 1996.

Weinstein, Clifford J., "The Experimental Integrated Switched Network—a System-Level Network Test Facility," IEEE, pp. 449-456, Jan. 1983.

"Computer Telephony and the Internet," pp. 1-8, downloaded, Jul. 14, 2009.

Jitian, Xiao, et al., "Sharing Model of Netware Node Resources and Real-Time Scheduling," Mini-Micro Systems, vol. 16, No. 12, pp. 54-59, Dec. 1995.

Swinehart, D.C., et al., "Adding Voice to an Office Computer Network," IEEE Global Telecommunications Conference, San Diego, CA, Nov. 28-Dec. 1, 1983.

Zellweger, Polle T., et al., "An overview of the etherphone system and its applications," Xerox Palo Alto Research Center, pp. 160-168, Apr. 1988.

Ng, L.J., et al., "Distributed architectures and databases for intelligent personal communication networks," Department of Electrical Engineering, U. Of British Columbia, pp. 300-304, Feb. 1992.

Malyan, Andrew D., et al., "Network architecture and signaling for wireless Personal communications," IEEE Journal on Selected Areas in Communications, vol. 11, No. 6, pp. 830-841, Aug. 1993.

Malyan, Andrew D., et al. "A Microcellular Interconnection Architecture for Personal Communications Networks," Department of Electrical Engineering, University of British Columbia Vancouver, B.C., V6T 1W.5, Canada, pp. 502-505, Feb. 1992.

Bakre, Ajay, et al., "M-RPC: A Remote Procedure Call Service for Mobile Clients," Department of Computer Science Rutgers, The State University of New Jersey Piscataway, NJ, pp. 97-110, 1995.

O'Malley, Sean W., "A Dynamic Network Architecture," Department of Computer Science, University of Arizona, ACM Transactions on computer systems, vol. 10, No. 2, pp. 110-143, May 1992.

Cheshire, Stuart, et al., "Internet Mobility 4 by 4," SIGCOMM 96 - Stanford, California, USA, pp. 1-2, Aug. 1996.

Chang, Rong N., et al., "A Service Acquisition Mechanism for the Client/Service Model in Cygnus," IBM Canada Laboratory Technical Report TR 74.059, pp. 323-345.

Arao, Shinya, et al., "Component-based policy deployment for service level differentiation in converging communication networks," IEEE, pp. 1388-1392, 1999.

Goyal, Pawan, et al., "Integration of call signaling and resource management for IP telephony," IEEE Network, pp. 24-32, May/Jun. 1999.

Delatore, J.P., et al., "The 5ESS switching system: Fatory system testing," AT+T Technical Journal, vol. 64, No. 6, Jul.-Aug. 1985.

Oran, Dave, "Dial plan mapping for voice-over-IP," Access Engineering, Apr. 11, 1996.

Getting started guide for Internet Phone release 4, http://www.vocaltec.com, 1993-1996 VocalTec Inc.

VocalTec desktop dialer version 3.0, User reference, http://www.vocaltec.com, 1997 VocalTec Ltd.

"Vocaltec's telephony gateway software captures 1996 product of the year honors from computer telephony magazine," Herzliya, Israel, Dec. 18, 1996, VocalTec, Ltd.

"Introduction to VTG," Northvale, NJ 07647, Tel. 201-768-9400, info@vocaltec.com.

Kahane, Opher, et al., "IMTC VoIP Forum Contribution." Subject: Call management agent system requirements function architecture and protocol, VoIP97-010, pp. 1-44, Seattle, Jan. 1, 1997.

Kahane, Opher, "Introduction to VocalTec's CMAsystem," Intelligent switching for a new era of telecom, Nov. 7, 1996.

Newton, Harry, "Newton's Telecom Dictionary," 22nd edition, p. 728, 2006.

Braden, R., et al., "Resource ReSerVation Protocol (RSVP)—Version 1 Functional Specification," Network Working Group, pp. 1-224, Univ. Of Michigan, Sept. 1997.

Keiser, Bernhard E., et al., "Digital Telephony and Network Integration," downloaded Jul. 1, 2008.

Boyle, Jim, et al., "The COPS (Common Open Policy Service) Protocol," http://www.ietforgiinternet-drafts/draft-ietfrap-cops-07.txt, pp. 1-35, Aug. 16, 1999.

Bellamy, John, "Digital telephony," Dallas, TX, Oct. 1981.

Open and standardized—the world of IP Protocols, "H.323: The Leading Standard in Voice over IP," downloaded Jul. 1, 2008.

"Inside APPN—The Essential Guide to the Next-Generation SNA," IBM, International Technical Support Organization Raleigh Center, Raleigh, NC, Jun. 1997.

Friedes, A., et al. "Integrating the world through communications," IEEE ICC, vol. 1 of 3, Jun. 22-25, 1986.

Huitema, Christian, "Routing in the internet," Prentice Hall, Englewood Cliffs, NJ, 1995.

Lucky, R.W., "Applications of communications theory," Fundamentals of digital switching, AT+T Laboratories, Second Edition, downloaded, Jul. 3, 2008.

Bellamy, John, "Digital telephony," Second Edition, Wiley Series in Telecommunications, downloaded, Jul. 3, 2008.

Stallings, William, "ISDN and Broadband ISDN with frame relay and ATM," Prentice Hall, Upper Saddle River, NJ, downloaded, Jul. 3, 2008.

GR-1298-CORE, AINGR: Switching Systems, Telcordia Technologies, Issue 10, Nov. 2004.

GR-2863-CORE, CCS Network Interface Specification (CCSNIS) Supporting Advanced Intelligent Network (AIN), Bellcore, Bell Communications Research, Issue 2, Dec. 1995.

GR-246-CORE, Telcordia technologies specification of signalling system No. 7, Telcordia Technologies, Issue 10, Dec. 2005.

GR-1280-CORE, Advanced intelligent network (AIN) service control point (SCP) generic requirements, Telcordia Technologies, Issue 1, Aug. 1993.

Morris, Christopher, Academic Press Dictionary of Science and Technology, Academic Press, downloaded, Jul. 3, 2008.

GR-1428-CORE, CCS Network Interface Specification (CCSNIS) Supporting Toll-Free Service, Bellcore, Issue 2, May 1995.

Mockapetris, P., "Domain names—concepts and facilities," Network working group, Nov. 1987.

Mockapetris, P., "Domain names—implementation and specification," Network Working Group, Nov. 1987.

Finseth, C. "An access control protocol, sometimes called TACACS," Network Working Group, University of Minnesota, pp. 1-20, Jul. 1993.

Carrel, D., "The TACACS+ Protocol," Network Working Group, Cisco, Oct. 1996.

ITU-T, "Line transmission of non-telephone signals," Recommendation H.323, May 28, 1996.

Product releases webpage, VocalTec, info@vocaltec.com, Aug. 26, 1996.

Tutorial on "H.323," by the International Engineering Consortium, http://www.iec.org, pp. 1-30, downloaded, Jul. 3, 2008.

Everhart, C., et al., "New DNS RR Definitions," Network Working Group, University of Maryland, pp. 1-11, Oct. 1990.

Handley, M., et al., "SIP: Session Initiation Protocol," Network Working Group, The Internet Society, Mar. 1999.

Rosenberg, J., et al., "SIP: Session Initiation Protocol," Network Working Group, The Internet Society, Jun. 2002.

Brannen, Lynn, et al., "Next generation switch," MCI Telecommunications, May 16, 1997.

Shen, Yi-Shang, "Communications network with flexible call routing and resource allocation," MCI Invention Disclosure Form, Jan. 8, 1998.

Kahane, Opher, et al, "Call management agent system specification," VoIP Forum Technical Committee Contribution, Chicago, IL, Aug. 14, 1996.

Pulver, Jeff, "The internet telephone tookit," Wiley Computer Publishing, New York, NY, 1996.

Peeren, Rene, "IN in the Hybrid Broadband Network the Intelligent Web," Presentation, Ericsson, IEEE 1996.

Jain, Surinder K., "Evolving Existing Narrowband Networks Towards Broadband Networks with IN Capabilities," Bellcore Intelligent Networks, IEEE, Apr. 22, 1996.

Matta, Ibrahim, et al, "Type-of-Service Routing in Dynamic Datagram Networks," Department of Computer Science, University of Maryland, pp. 992-999, IEEE 1994.

Yeager, Nancy J., et al., "Web Server Technology: The Advanced Guide for World Wide Web Information Providers," National Center for Supercomputing Applications, pp. 250, Morgan Kaufman Publishers, Inc., 1996.

Kishimoto, Ryozo, "Agent Communication System for Multimedia Communication Services," IEEE INFOCOM, Fifteenth Annual Joint Conference of the IEEE Computer and Communications Societies, pp. 10-17, Mar. 24-28, 1996.

Willebeek-LeMair, Marc H., "Videoconferencing over Packet-Based Networks," IEEE Journal on Selected Areas in Communications, vol. 15. No. 6, pp. 1101-1114, Aug. 1997.

Kumar, Vinay, "Internet Multicasting: Internet's Next Big Thing," ICast Corporation, pp. 1-13, Sep. 23, 1997.

The Wall Street Journal article on: "MCI's New Service for Corporate Use Sets 1 Line for Net, Phone," p. B16, Jan. 30, 1997.

Sharp, C.D., et al., "Advanced Intelligent Networks-now a reality," Electronics .and. Communication Engineering Journal, pp. 153-162, Jun. 1994.

Pezzutti, David A., "Operations Issues for Advanced Intelligent Networks," IEEE Communications Magazine, pp. 58-63, Feb. 1992.

Oppen, Derek C., et al., "The Clearinghouse: A Decentralized Agent for Locating Named Objects in a Distributed Environment," ACM Transactions on Office Information Systems, vol. 1, no. 3, Jul. 1983, pp. 230-253.

Rendleman, John, et al., "ATM Goes Into Orbit . . .While IP Gets Speedy in Space," Communications Week, Mar. 17, 1997, www.commweek.com.

Miller, Mark A., "Troubleshooting TCP/IP: Analyzing the Protocols of the Internet," M.And.T Books, pp. 365-389, 1992.

Platt, Richard, "Why IsoEthernet Will Change the Voice and Video Worlds," IEEE Communications Magazine, pp. 55-59, Apr. 1996.

Quicklook, "Internet by Stellite," 1 page, http://www.netsatx.net.

Rosalyn, Retkwa, "Telephone Politics," Internet World, Jun. 1996.

Schreyer, Oliver, et al., "Least Cost Call Routing—A Brilliant Application for Private IN," IEEE International Conference on Communications, vol. 2 of 3, Jun. 23-27, 1996.

Rodriguez Serrano, Inma, "Evolution of a Hybrid Fibre Coaxial Network for Multimedia Interactive Services," British Telecommunications Egineering, vol. 15, pp. 249-253, Oct. 1996.

Sunaga, Hiroshi, et al., "A Reliable Communication Switching Platform for Quick Service Provisioning," IEEE International Conference on Communications, Seattle, WA, Jun. 18-22, 1995.

Marketing materials re: Workshops on "Telephony on the Internet," to take place on Sep. 24-25, 1996, at The Drake Hotel, Chicago, Illinois.

Gralla, Preston, "How the Internet Works," Ziff-Davis Press, pp. 118-119, 1996.

Gralla, Preston, "How the Internet Works," Ziff-Davis Press, pp. 64-67, 1996.

Tsuchida, Hisazumi, et al., "Intelligent Dynamic Service Provisioning Architecture in the Multimedia Era," NTT Information and Communication Systems Laboratories, IEEE, pp. 1117-1122, 1996.

Low, Colin, "Integrating Communication Services," IEEE Communications Magazine, pp. 164-169, Jun. 1997.

Fridisch, M., et al., "Terminals for Accessing the Internet—The Internet Telephone," Alcatel Telecommunications Review, 4th Quarter, pp. 304-309, 1996.

Hurwicz, Michael, "Switched ATM is fast, but not that smart. Routed IP is smart, but not that fast. Why not combine them?," http://www.ipsilon.com/, Apr. 1997.

Diehl, Standford, "Data's New Voice," BYTE, Special Report, pp. 129-135, Sep. 1996.

Kahn, Jeffery, "Videoconferencing Debuts on the Internet," LBL, U.S. Department of Energy, Berkeley, California, University of California, Feb. 28, 1995.

Braun, Hans-Werner, et al., "A framework for flow-based accounting on the Internet," National Science Foundation (NCR-9119473), downloaded, Aug. 21, 2008.

Kelly, Katy, "Up to their laptops in packed powder: Mountaintop office keeps skiers in touch," USA Today, Final Edition, News, p. 1A, Feb. 21, 1997.

Braun, Torsten, "Implementation of an Internet Video Conferencing Application over ATM," IBM European Networking Center, Heidelberg, Germany, IEEE, pp. 287-294, 1997.

Sclavos, Jean, et al., "Information Model: From Abstraction to Application," Telecom Paris, France, pp. 1-13, downloaded, Aug. 21, 2008.

Black, Uyless D., "OSI: A model for computer communications standards," Prentice-Hall, Inc., pp. 157-201, 1991.

Sriram, Kotikalapudi, et al., "Voice Packetization and Compression in Broadband ATM Networks," IEEE Journal on Selected Areas in Communications, vol. 9, No. 3, pp. 294-304, Apr. 1991.

Arango, Mauricio, et al., "Guaranteed Internet Bandwith," IEEE, pp. 862-866, Nov. 18, 1996.

Lapolla, Stephanie, "Seagate joins the backup vendors' enterprise forays," PC Week, The National Newspaper of Corporate Computing, vol. 13, No. 33, Aug. 19, 1996.

Harmer, Julie, et al., "Revised Requirements for Mobile-API-Interim deliverable," OnTheMove public project, pp. 1-44, Dec. 1996.

Schulzrinne, Henning, "Personal Mobility for Multimedia Services in the Internet," IDMS '96 (European Workshop on Interactive Distributed Multimedia Systems and Services), Berlin, Germany, pp. 1-18, Mar. 4-6, 1996.

Schulzrinne, "Simple Conference Invitation Protocol," Internet Engineering Task Force, pp. 1-19, Feb. 22, 1996.

Ash, G.R., et al., "Design and Optimization of Networks With Dynamic Routing," American Telephone and Telegraph Company, The Bell System Technical Journal, vol. 60, No. 8, pp. 1787-1820, Oct. 1981.

Prosecution history of U.S. Appl. No. 6,332,023, Issued, Dec. 18, 2001.

The Phone Zone, an online reference cite and catalog of PC based telephony and networking solution for business, http://www.phonezone.com/index2.htm, Oct. 29, 1996.

"IDT's Net2Phone Launches Phone-to-Phone Technology Via the Internet," Press release, http://web.net2phone.com/about/press/releases/p2p.asp, Sep. 8, 1997.

"Vocaltec's telephony gateway—the ultimate internet telephony solution?," Computer Telephony, p. 30, Sep. 1996.

Cheriton, David R., "Dissemination-Oriented Communication Systems: Final Report," ARPA contract No. DABT63-91- K-0001, Nov. 26, 1996.

Johnson, David B., "Scalable Support for Transparent Mobile Host Internetworking," Proceedings of the Ninth Annual IEEE Worshop on Computer Communications, pp. 1-10, Oct. 1994.

"Specifications of Signalling System No. 7," International Telecommunication Union, ITU-T Telecommunication Standardization Sector of ITU, Recommendation, Q.700, Mar. 1993.

"Integrated Services Digital Network (ISDN) 1.312," CCITT The International Telegraph and Telephone Consultative Committee, ITU International Telecommunication Union, Recommendation, I.312/Q.1201, Oct. 1992.

"Interface Recommendation for Intelligent Network CS-1," International Telecommunication Union, ITU-T Telecommunication Standardization Sector of ITU, ITU-T Recommendation Q.1218, Oct. 1995.

"Series Q: Switching and Signaling," Intelligent Network, International Telecommunication Union, ITU-T, Telecommunication Standardization Sector of ITU, Recommendation Q.1218—Addendum 1, Sep. 1997.

Haley, James E., "Pay-per-call blocking using LIDB," AIN Service Description, Bell Atlantic Easy Number Call Routing Service, Oct. 1996.

American National Standard for Telecommunications—Signalling System No. 7 (SS7)—Signalling Connection Control Part (SCCP), American National Standards Institue, Inc., ANSITI.112-1992, Oct. 26, 1992.

American National Standard for Telecommunications—Signalling System No. 7 (SS7)—Message Transfer Part (MTP), American National Standards Institue, Inc., Mar. 14, 1996.

American National Standard for Telecommunications—Signalling System No. 7 (SS7)—Signalling Connection Control Part (SCCP), American National Standards Institue, Inc., ANSITI.110-1992, Jun. 2, 1992.

Gasman, Lawrence, "Broadband networking," Van Nostrand Reinhold, Jun. 13, 1994.

Balkovich, Ed, et al., "Project clarity: First internal trial," Readiness Review, Bell Atlantic Confidential and proprietary, Jul. 21, 1997.

Grigonis, Richard "Zippy," "Computer telephony over the internet," CT and the 'Net, Mar. 1996.

Park, Myung Ah, et al., "Dial-up internet access service system with automatic billing mechanism," ICICS 1997, Electronics .and. Telecommunications Research Institute, pp. 148-151, Singapore, Sep. 9-12 1997.

El-Gendy, Hazem, et al., "Computer-supported routing for intelligent networks and personalized wired communications," ICCS 1994, pp. 1027-1033, Aug. 1994.

"Audio and video over the internet," CT and the 'Net, Mar. 1996.

Malamud, Carl, et al., "Internet talk radio: Geek of the week," Mobile IP Networking, O'Reilly .and. Associates, Inc., transcript of interview, Nov. 1993.

McConnell, Brian, "How to build an internet PBX," Pacific Telephony Design, http://www.phonezone.com/ip-phone.htm, pp. 1-9, Oct. 28, 1996.

Sears, Andrew, "Innovations in Internet Telephony: The Internet as the Competitor to the POTS Network," Innovation in Internet Telephony: The Internet as the Successor to the POTS Network, pp. 1-6, Feb. 28, 1996.

"Supercharging the web with computer telephony," CT and the 'Net, Mar. 1996.

Anand, Surinder S., et al., "Accounting architecture for cellular networks," ICPWC '96, IEEE, pp. 184-189, 1996.

Karttunen, Jari, et al., "Cost structure analysis and reference model for SCALEABLE network services," The Institution of Electrical Engineers, pp. 1-9, 1996.

Jennings, Barbara J., "End-User Requirements for High-Integrity Directory," Sandia National Laboratories, Albuquerque, IEEE, pp. 1793-1796, 1996.

Botvich, D., et al., "On Charging for Internet Services provided over an A.TIVI network," IEEE, pp. 669-679, 1997.

Estrin, Deborah, et al., "Design Considerations for Usage Accounting and Feedback in Internetworks," downloaded, Aug. 19, 2008.

Li, Chung-Sheng, et al., "Time-driven Priority" Flow Control for Real-time Heterogeneous Internetworking, IBM T. J. Watson .and. esearch Center, IEEE, pp. 189-197, 1996.

Edell, RJ., et al., "Billing users and pricing for TCP," IEEE Journal on Selected Areas in Communications, vol. 13, Issue 7, pp. 1162-1175, Sep. 1995.

Margulies, Ed, "CT's Cyberdate With the 'NET," Computer Telephony Periscope, pp. 28-29, Aug.1996.

Inamori, Hisayoshi, et al., "Common Software Platform for Realizing a Strategy for Introducing the TMN," Network Operations and Management Symposium, vol. 2, pp. 579-589, Feb. 1998.

Rajan, R., et al., "A policy framework for integrated and differentiated services inthe Internet," Network, IEEE, vol. 13, Issue 5, pp. 36-41, Sep./Oct. 1999.

Louth, Nick, "MCI Communications Corp. vaults phone-data divide," Reuters Limited, News article, Jan. 29, 1998.

Eriksson, Hans, "MBONE: The Multicast Backbone," file:lIICI/Documents%20and%20Settings/ralbertJDesktopIMBONE%2OThe%20Multicast%20Backbone. htm (1 of 13) Mar. 7, 2008 4:06:17 PM.

Macedonia, Michael R., et al., "MBone Provides Audio and Video Across the Internet," file:///Cl/Documents%20and%20Settings/ralbert/Deskt...20Audio%20and%20Video%20Across%20the%20Internet.htm (1 of 13) Mar. 10, 2008 9: 34:00 AM.

Lapolla, Stephanie, "Net call centers, voice to merge," News, PC Week, Mar. 31, 1997.

Bohn, Roger, et al., "Mitigating the coming Internet crunch: multiple service levels via precedence," San Diego Supercomputer Center, Mar. 22, 1994.

Weiss, W., "QoS with differentiated services," Bell Labs Technical Journal vol. 3, No. 4, pp. 48-62, Oct.-Dec. 1998.

Hartanto, Felix, et al., "Policy-Based Billing Architecture for Internet Differentiated Services," Proceedings of IFIP Fifth International Conference on Broadband Communications (BC '99), Hong Kong, Nov. 10-12 1999.

Mahadevan, I., et al., "Parallel Architectures, Algorithms, and Networks," (I-SPAN '99) Proceedings. Fourth InternationalSymposium, pp. 420-425, Jun. 23-25, 1999.

Schulzrinne, H., et al., "A Transport Protocol for Real-Time Applications," Network Working Group, Audio-Video Transport Working Group, pp. 1-151, Mar. 10, 2008.

Schulzrinne, H., "RTP Profile for Audio and Video Conferences with Minimal Control," Network Working Group, Audio-Video Transport Working Group, pp. 1-18, Jan. 1996.

Kim, Gary, "Talk is cheap voice over the internet," America's Network, pp. 34-39, Jul. 15, 1996.

Newton, Harry, "Notes from the field: The personal side of CT," 12 Computer Telephony, Jan. 1997.

Venditto, Gus, "Internet phones the future is calling," Internet World Magazine, Jun. 1996.

Crowcroft, Jon, et al., "Pricing internet services," Department of Computer Science, UCL, Gower Street, London, UK, pp. 1-16, downloaded, Aug. 19, 2008.

Newton, Harry, "Telephony Messaging on the Internet," http://www.dialogweb.com/cgi/dwclient?req=1205770063076 (1 of 5) Mar. 17, 2008 12:08:09 PM.

Maruyama, Katsumi, et al., "A Concurrent Object-Oriented Switching Program in Chill," 2460 IEEE Communications Magazine, 29(1991) Jan., No. 1, pp. 60-68, New York.

Rajkumar, R., et al., "A resource allocation model for QoS management," Proceedings. The 18th IEEE Real-Time Systems Symposium (Cat.No.97CB36172) pp. 298-307, Dec. 2-5, 1997.

Weinrib, a., et al., "Decentralized resource allocation for distributed systems," IEEE INFOCOM '87. The Conference on Computer Communications. Proceedings. Sixth Annual Conference—Global Networks: Concept to Realization (Cat. No.87CH2412-5) p. 328-36, M.

Shabana, Mohamed, et al., "Intelligent switch architecture," 8081 Proceedings of the National Communications Forum 42 (1988) Sep. 30, No. 2, Chicago, IL., pp. 1312-1319.

Nagarajan, Ramesh, et al., "Local Allocation of End-to-End Quality-of-Service in High-Speed Networks," National Research Foundation under grant NCR-9116183 and the Defense Advanced Projects Research Agency under contract NAG2-578, pp. 1-28, downloaded, A.

Elixmann, Martin, et al., "Open Switching—Extending Control Architectures to Facilitate Applications," ISS Symposium, pp. 239-243, Apr. 23, 1995.

Chandra, P., et al., "Network support for application-oriented QoS," (IWQoS 98) 1998 Sixth International Workshop on Quality of Service, pp. 187-195, May 18-20, 1998.

Klein, Rachelle S., et al., "Minimax Resource Allocation With Tree Structured Substitutable Resources," Operations Research, vol. 39, No. 2, pp. 285-295, Mar.-Apr. 1991.

Nyong, D., et al., "Resource based policies for design of interworking heterogeneous service networks," Interoperable Communications Networks, vol. 1, Nos. 2-4, pp. 571-80, 1998.

Kabay, S., et al., "The service node-an advanced IN services element," 8438 BT Technology Journal vol. 13 (1995) Apr., No. 2, pp. 64-72.

Mayer, Robert L., et al., "Service Net-2000: An intelligent network evolution," 8010 At.and.T Technical Journal 70 (1991) Summer, No. 3/4, pp. 99-110, Short Hills, NJ.

Gupta, Amit, "Resource sharing for multi-party real-time communication," Proceedings of the Fourteenth Annual Joint Conference of the IEEE Computer and Communication Societies (INFOCOM '95), pp. 1230-1237, 1995.

Kausar, Nadia, et al., "A Charging Model for Sessions on the Internet," IEEE, pp. 32-38, Apr. 1999.

Schutzrinne, Henning, "A comprehensive multimedia control architecture for the Internet," IEEE, pp. 65-76, Sep. 1997.

Tsaoussidis, V., et al., "A CORBA-based Application Service Middleware Architecture and Implementation," State University, of NY at Stony Brook, pp. 1-7, downloaded, Aug. 19, 2008.

Bernet, Y., et al., "A Framework for Differentiated Services," The Internet Society, pp. 1-35, Sep. 22, 1999.

Gleeson, B., et al., "A Framework for IP Based Virtual Private Networks," The Internet Society, pp. 1-62, Feb. 2000.

Yavatkar, Raj, et al., "A Framework for Policy-based Admission Control," Internet Engineering Task Force, pp. 1-19, Apr. 1999.

Ekstein, Ronnie, et al., "AAA Protocols: Comparison between RADIUS, DIAMETER and COPS," Internet Engineering Task Force (IEFT), pp. 1-17, Aug. 1999.

Hussmann, H., et al., "An edge device for supporting internet integrated services over switched ATM networks," pp. 1-10, downloaded, Aug. 19, 2008.

Sinnreich, H., et al., "Interdomain IP communications with QoS, authorization and usage reporting," http:www.ietf.org/internet-drafts . . ., Jan. 2000.

Mascolo, Cecilia, et al., "An XML based Programmable Network Platform," Dept. Of Computer Science, University College London, pp. 1-5, Jun. 10, 2005.

Kumar, Vijay P., et al., "Beyond Best Effort: Router Architectures for the Differentiated Services of Tomorrow's Internet," IEEE Communications Magazine, pp. 152-164, May 1998.

Pan, Ping, et al., "Diameter-SIP," Internet Draft, pp. 1-15, Nov. 15, 1998.

Neilson, Rob, et al., "A Discussion of Bandwidth Broker Requirements for Internet2 Qbone Deployment," Internet2 Qbone BB Advisory Council, Version 0.7, pp. 1-30, Aug. 1999.

Stojsic, Goran, et al., "Formal Definition of SIP Proxy Behavior," IEEE, pp. 289-292, Feb. 2001.

Bhuyan, L, et al., "Impact of switch Design on the Application Performance of Cache-Coherent Multiprocessors," Dept. Of Computer Science, Texas A.and.M University and Intel Corp., pp. 1-9, Nov. 15, 2005.

Product Overview, "IP Highway product overview," http://iphighway.com/prod/, pp. 1-4, Sep. 22, 1999.

Rosenberg, Jonathan, et al., "Internet telephony gateway location," IEEE, pp. 488-496, Feb. 1998.

Wright, S., et al., "IP "Telephony" vs. ATM: What is There to Discuss?," IEEE, pp. 400-409, Feb. 1998.

Wedlund, Elin, et al., "Mobility support using SIP," WoWMoM, Jan. 1999.

Aiken, B., et al., "Network Policy and Services: A report of a Workshop on Middleware," Network Working Group, pp. 1-26, Feb. 2000.

Aspnes, James, et al., "On-Line Routing of Virtual Circuits willi Applications to Load Balancing and Machine Scheduling," pp. 486-504, Journal of the ACM, vol. 44, No. 3, May 1997.

Salsano, Stefano, et al., "QoS Control by Means of COPS to Support SIP-Based Applications," IEEE Network, Mar./Apr. 2007.

White, Paul P., "RSVP and Integrated Services in the Internet: A Tutorial," IEEE Communications Magazine, pp. 100-106, May 1997.
Beck, Christopher J., et al., "Scheduling alternative activities," http://www.aaai.org/home.html, 1999.
Flykt, P., et al., "SIP Services and Interworking IPv6," 3G Mobile Communication Technologies, March 26-28, 2001, Conference Publication No. 477.
Schulzrinne, Henning, et al., "Signaling for internet telephony," Columbia University, Dept. Of Computer Science Technical Report CUCS-005-98, Feb. 2, 1998.
Barzilai, Tsipora, et al., "Design and Implementation of an RSVP-based Quality of Service Architecture for Integrated Services Internet," IEEE, May 1997.
Hubaux, Jean-Pierre, et al., "The impact of the Internet on telecommunication architectures," Computer Networks 31 (1999).
Roberts, Erica, "The New Class System," http://www.data.com/roundups/class_system.html, pp. 1-14, Sep. 22, 1999.
Wroclawski, J., "The Use of RSVP with IEFT Integrated Services," ftp://ftp.isi.edu/in-notes/rfc2210.txt, Sep. 22, 1999.
Sloman, Morris, et al., "Distributed Management for the Networked Millennium," Proceedings of the Sixth IFIP/IEEE International Symposium on Integrated Network Management - Boston, MA, U.S.A., May 24-28, 1999.
Schulzrinne, Henning, "MIME-Version: 1.0," email communication dated Oct. 10, 1995.
Garrahan, James J., et al., "Marching toward the global intelligent network," IEEE Communications Magazine, vol. 31, No. 3, pp. 30-36, Mar. 1993.
Gys, L, et al., "Intelligence in the Network," Alcatel Telecommunications Review, pp. 13-22, 1st Quarter 1998.
Yang, C., "INETPhone Telephone Services and Servers on Internet," Network Working Group, pp. 1-6, Apr. 1995.
Perret, Stephane, et al., "MAP: Mobile Assistant Programming for Large Scale Communication Networks," IEEE, pp. 1128-1132, Apr. 1996.
Plunkett, Bill, "ISCP Service Capacity Improvements," Bellcore, Feb. 29, 1996.
Murray, Dave, "High speed signalling link interface for ISCP version 6.0," Bellcore, Feb. 29, 1996.
Evans, Jeff, "Alternative Approaches for Multi-ISCP Locator," Bell Atlantic, Mar. 13, 1996.
Performance Task Force, "Off-Line Engineering Tool," Bellcore, Sep. 3, 1996.
Jones, Doug R., "Advanced intelligent network delivering control of network routing," Bell Atlantic, downloaded, Aug. 20, 2008.
Gorton, Dave, "ISCP Evolution overview," Telcordia Technologies Inc., Jun. 5, 2001.
Brown, Kathryn C., "Telecom Convergence," PowerPoint presentation, downloaded Aug. 21, 2008.
Cohen, Danny, "Specifications for the Network Voice Protocol (NVP)," http://www.rfc-archive.org/getrfc.php?rfc=741, Nov. 22, 1977.
Low, Colin, "The Internet Telephony Red Herring," Hewlett Packard, pp. 1-15, May 15, 1996.
de la Fuente, L.A., et al., "Application of the TINA-C Management Architecture," Bellcore, Red Bank, NJ, downloaded, Aug. 21, 2008.
Finseth, C. "An access control protocol, sometimes called TACACS," Network Working Group, University of Minnesota, pp. 1-21, Jul. 1993.
Buchanan, Ken, et al., "IMT-2000: Service Provider's Perspective," IEEE Personal Communications, pp. 8-13, Aug. 1997.
Pontailler, Catherine, "TMN and New Network Architectures," IEEE Communications Magazine, pp. 84-88, Apr. 1993.
Mills, Mike, "Phone service via the Internet may slash rates," The Washington Post, A Section; p. A01, Sunday, Final Edition, Aug. 11, 1996.
Chapman, Martin, et al, "Overall Concepts and Principles of TINA," TINA-C, Version 1.0, Feb. 17, 1995.
Kahane, Opher, et al, "Call Management Agent System Specification," Voice over IP Forum Technical Committee in Chicago, Aug. 14, 1996.
Verjinski, Richard D., "PHASE, A Portable Host Access System Environment," IEEE, May 1989.

*Verizon Services Corp., et al., v. Cox Fibernet Virginia, Inc., et al.*, Report of Herman J. Helgert, Ph.D., Exhibit D, downloaded, Aug. 21, 2008.
*Verizon Services Corp., et al., v. Cox Fibernet Virginia, Inc., et al.*, Report of Herman J. Helgert, Ph.D., Exhibit E, downloaded, Aug. 21, 2008.
*Verizon Services Corp., et al., v. Cox Fibernet Virginia, Inc., et al.*, Report of Herman J. Helgert, Ph.D., Exhibit F, downloaded, Aug. 21, 2008.
The Jeff Pulver Blog: Free World Dialup and Verizon's patent on "name translation," http://pulverblog.pulver.com/archives/006846.html, pp. 1-19, Apr. 23, 2007.
Lipoff, Stuart, "Operations Support System Framework for Data Over Cable Services," Data Over Cable Technical Reports, MCNS Holdings, L.P., Oct. 16, 1996.
Sinnreich, H., et al., "Interdomain IP communications with QoS, authorization and usage reporting," http:www.cs.columbia.edu/-hgs/sip/drafts/draft-sinnreich-sip-qos-osp, Feb. 2000.
Pan, Ping, et al., "Diameter: Policy and Accounting Extension for SIP," Internet Engineering Task Force, Internet Draft, pp. 1-17, Nov. 15, 1998.
Schulzrinne, Henning, et al., "Interaction of Call Setup and Resource Reservation Protocols in Internet Telephony," pp. 1-13, Jun. 11, 1999, downloaded, Aug. 21, 2008.
Rosen, E., et al., "Memo re: BGP/MPLS VPNs," Networking Group, pp. 1-25, Mar. 1999.
Waksberg, M., "Axe 10 and the Intelligent Network," Commutation .and. Transmission, No. 4, pp. 67-76, Dec. 1993.
Niitsu, Yoshihiro, et al., "Computer-aided stepwise service creation environment for intelligent network," NTT Communication Switching Laboratories, Tokyo, Japan, IEEE, pp. 454-458, 1992.
Morgan, Michael J., et al., "Service creation technologies for the intelligent network," At.and.t Technical Journal, Summer 1991.
Fujioka, Masanobu, et al., "Universal service creation and provision environment for intelligent network," XIII International Switching Symposium, Stockholm, Sweden, Proceedings vol. III, pp. 149-156, May 27 - Jun. 1, 1990.
Moy, J., "OSPF Version 2," Network Working Group, Proteon, Inc., Jul. 1991.
Lantz, Keith A., "Towards a universal directory service," Operating Systems Review, vol. 20, No. 2, Apr. 1986.
Fang, Wenjia, "Building an Accounting Infrastructure for the Internet," Princeton University, IEEE, pp. 105-109, 1996.
Aidarous, Salah, et al., "The role of the element management layer in network management," 1994 IEEE Network Operations and Management Symposium, Feb. 14-17, 1994.
Gareiss, Robin, "Voice over the internet," Data Communications, pp. 93-100, Sep. 1996.
Bethoney, Herb, "HAHTSite Gives Pros Everything They Need," PC Week, p. 36, Mar. 10, 1997.
Kolarov, Aleksandar, et al., "End-to-end Adaptive Rate Based Congestion Control Scheme for ABR Service in Wide Area ATM Networks," IEEE International Conference on Communications, Seattle, Washington, pp. 138-143, Feb. 1995.
Chen, Larry T., et al., "ATM and Satellite Distribution of Multimedia Educational Courseware," 1996 IEEE International Conference on Communications, pp. 1133-1137, Jun. 23-27, 1996.
Civanlar, M. Reha, et al., "FusionNet: Joining the Internet .and. Phone Networks for Multimedia Applications," ACM Multimedia 96, pp. 431-432, 1996.
Cobbold, Christopher, et al., "Enhancement for Integrated Wireless Personal Communications over Metropolitan Area Networks," 1996 IEEE International Conference on Communications, pp. 1370-1376, Jun. 23-27, 1996.
Corner, Douglas E., "Internetworking With TCP/IP," 3rd ed., V. 1. Principles, protocols, and architecture, Prentice-Hall, Inc., 1995.
Mahadevan, I., et al., "Quality of service achitectures for wireless networks: IntServ andDiffServ models," http://ieeexplore.ieee.org/xpllabsprintf.jsp?arnumber==778974.and.page. . ., Aug. 6, 2002.
Ahmadi, H., et al., "NBBS Traffic management overview," IBM Systems Journal, vol. 34, No. 4, pp. 604-628, 1995.
Stoica, Ion, et al., "LIRA: An Approach for Service Differentiation in the internet," sponsored by DARPA under contract Nos. N66001-96-

C-8528 and NOOI74-96-K-0002, and by a NSF Career Award under grant No. NCR-9624979. Additional support was provi.

Duan, Juan, et al., "Efficient Utilization of Multiple Channels between two Switches In ATM Networks," IEEE, pp. 1906-1911, 1995.

Ejiri, Masayoshi, et al., "For Whom the Advancing service/network management," IEEE, pp. 422-433, 1994.

Lee, Whay Chiou, et al., "Integrated Packet Networks With Quality of Service Constraints," Globecom, IEEE, pp. 8A.3.1-8A.3.5, 1991.

Elia, Carlo, et al., "Skyplex: Distributed Up-link for Digital Television via Satellite," IEEE Intelligent Network workshop IN, Melbourne, Australia, Apr. 21-24, 1996.

Ely, Tom, "The Service Control Point as a Cross Network Integrator," Bellcore, IEEE, pp. 1-8, 1996.

Mamais, G., et al., "Efficient buffer management and scheduling in a combined IntServand DiffServ architecture: a performance study," ATM, 1999. ICATM '99. 1999 2nd International Conference on, pp. 236-242, Jun. 21-23, 1999.

Baumgartner, F., et al., "Differentiated services: a new approach for quality of service in the Internet," Proceedings of Eighth International Conference on High Performance Networking, pp. 255-273, Sep. 21-25, 1998.

Sibal, Sandeep, et al., "Controlling Alternate Routing in General-Mesh Packet Flow Networks," SIGCOMM 1994, London, England, pp. 168-179, Aug. 1994.

Jajszczyk, A., et al., "Bringing information to People," IEEE INFOCOM '95, Proceedings, vol. 3, Apr. 2-6, 1995.

CT and the 'Net, "Webphone," Computer Telephony pp. 219-221, Mar. 1996.

Sisalem, Dorgham, et al., "The Network Video Terminal," IEEE Proceedings of HPDC-5, pp. 3-10, 1996.

Baumgartner, H., et al., "Middleware for a New Generation of Mobile Networks: The ACTS OnTheMove Project," http://www.isoc.org/inet96/proceedings/a6/a6_3.htm, pp. 1-4, Apr. 14, 2008.

"Talk Talk," tele.com, pp. 68-72, Jun. 1996.

Kreller, Birgit, et al., "UMTS: A Middleware Architecture and Mobile API Approach," IEEE Personal Communications, pp. 32-38, Apr. 1998.

Low, Colin, et al., "WebIN—An Architecture for Fast Deployment of IN-based Personal Services," IEEE, 1996.

Grami, A., et al., "The Role of Satellites in the Information Superhighway," IEEE International Conference on Communications, pp. 1577-1581, Jun. 18-22, 1995.

Gupta, Ranabir, et al., "Technical Assessment of (T)INA - TMN - OSI Technology for Service Management Applications," IEEE Network Operations and Management Symposium, vol. 3, pp. 877-887, Feb. 14-17, 1994.

Inamori, Hisayoshi, et al., "Applying TMN to a Distributed Communications Node System with Common Platform Software," NTT Network Service Systems Laboratories, Tokyo, Japan, pp. 83-87, IEEE International Conference on Communications, Seattle, WA, Jun. 18.

Clark, David D., et al., "Supporting Real-Time Applications in an Integrated Services Packet Network: Architecture and Mechanism," COMM'92, MD, USA, pp. 14-26, Aug. 1992.

* cited by examiner

TRANSPORT OF CALLER IDENTIFICATION INFORMATION THROUGH DIVERSE COMMUNICATION NETWORKS

RELATED APPLICATIONS

This application is a continuation of application Ser. No. 08/822,602 now U.S. Pat. No. 6,292,479 filed Mar. 19, 1997.

This application is related to application Ser. No. 08/821,027, filed Mar. 3, 1997 and entitled Voice Call Alternative Routing Through PSTN And Internet Networks, application Ser. No. 08/634,544, entitled Universal Access Multimedia Network, filed Apr. 18, 1996 (now U.S. Pat. No. 5,790,548), application Ser. No. 08/634,543, entitled Internet Telephone Service, filed Apr. 18, 1996 and application Ser. No. 08/670,908, entitled Internet Telephone System, filed Jun. 28, 1996 (now U.S. Pat. No. 6,069,890). The specification of those applications are incorporated herein by reference in their entirety.

TECHNICAL FIELD

The present invention relates to telecommunications networks and more particularly to the transport of a voice call through diverse network paths including a switched telephone network and a wide area data internetwork, for example, the Internet. The routing set-up for such call includes conveyance of caller identification information to the destination network to enable provision of caller information based enhanced services to subscribers.

BACKGROUND OF THE INVENTION

Implementation of voice telephone service over a worldwide data network, such as the Internet, offers advantages that are now being explored. The Internet basically comprises several large computer networks joined together over high-speed data links ranging from ISDN to T1, T3, FDDI, SONET, SMDS, OT1, etc.

A computer network is simply a collection of autonomous computers connected together to permit sharing of hardware and software resources, and to increase overall reliability. The qualifying term "local area" is usually applied to computer networks in which the computers are located in a single building or in nearby buildings, such as on a college campus or at a single corporate site. When the computers are further apart, the terms "wide area network" or "long haul network" are used, but the distinction is one of degree and the definitions sometimes overlap.

A bridge is a device that is connected to at least two LANs and serves to pass message frames or packets between LANs, such that a source station on one LAN can transmit data to a destination station on another LAN, without concern for the location of the destination. Bridges are useful and necessary network components, principally because the total number of stations on a single LAN is limited. Bridges can be implemented to operate at a selected layer of protocol of the network.

In operation, computer networks are governed by protocols, i.e., sets of conventions or rules that govern the transfer of data between computer devices. The simplest protocols define only a hardware configuration, while more complex protocols define timing, data formats, error detection and correction techniques, and software structures. Protocols generally are employed in multiple layers. A low-level physical layer protocol assures the transmission and reception of a data stream between two devices. Data packets are constructed in a data link layer. Over the physical layer, a network and transport layer protocol governs transmission of data through the network, thereby ensuring end-to-end reliable data delivery.

The Internet is a collection of networks, including Arpanet, NSFnet, regional networks such as NYsernet, local networks at a number of university and research institutions, and a number of military networks. TCP/IP protocols provide a set of services that permit users to communicate with each other across the entire Internet. The specific services that these protocols provide include file transfer, remote log-in, remote execution, remote printing, computer mail, and access to network file systems.

The basic function of the Transmission Control Protocol (TCP) is to ensure that commands and messages from an application protocol, such as computer mail, are sent to their desired destinations. TCP provides for keeping track of what is sent, and for retransmitting anything that does not get to its destination correctly. If any message is too long to be sent as one "datagram," it will be split into multiple datagrams and TCP protocol ensures that they all arrive correctly and are reassembled for the application program at the receiving end. Since these functions are needed for many applications, they are collected into a separate protocol (TCP) rather than being part of each application.

The Internet Protocol (IP) provides a basic service to TCP: delivering datagrams to their destinations. TCP in effect hands IP a datagram with an intended destination; IP is unaware of any relationship between successive datagrams, and merely handles routing of each datagram to its destination. If the destination is a station connected to a different LAN, the IP makes use of routers to forward the message.

TCP/IP operates as a five layer protocol, the five layers generally described as follows:

Layer 5—The Application Layer. Applications such as ftp, telnet, SMTP, and NFS relate to this layer.

Layer 4—The Transport Layer. In this layer, TCP and UDP add transport data to the packet and pass it to layer 3.

Layer 3—The Internet Layer. When an action is initiated on a local host (or initiating host) that is to be performed or responded to on a remote host (or receiving host), this layer takes the package from layer 4 and adds IP information before passing it to layer 2.

Layer 2—The Network Interface Layer. This is the network device as the host, or local computer, sees it and it is through this medium that the data is passed to layer 1.

Layer 1—The Physical Layer. This is literally the Ethernet or Serial Line Interface Protocol (SLIP) itself.

At the receiving host the layers are stripped one at a time, and their information is passed to the next highest level until it again reaches the application level. If a gateway exists between the initiating and receiving hosts, the gateway takes the packet from the physical layer, passes it through a data link to the IP physical layer to continue. As a message is sent from the first host to the second, gateways pass the packet along by stripping off lower layers, readdressing the lower layer, and then passing the packet toward its final destination.

A router, like a bridge, is a device connected to two or more LANs. Unlike a bridge, however, a router operates at the network layer level, instead of the data link layer level. Addressing at the network layer level may make use of a 32-bit address field for each host, and the address field includes a unique network identifier and a host identifier within the network. Routers make use of the destination network identifier in a message to determine an optimum path from the source network to the destination network. Various routing algorithms may be used by routers to determine the optimum paths. Typically, routers exchange information about the identities of the networks to which they are connected.

When a message reaches its destination network, a data link layer address is needed to complete forwarding to the destination host. Data link layer addresses are 48 bits long and are globally unique, i.e., no two hosts, wherever located, have the same data link layer address. A protocol called ARP (address resolution protocol) obtains a data link layer address from the corresponding network layer address (the address that IP uses). Typically, each router maintains a database table from which it can look up the data link layer address, but if a destination host is not in this ARP database, the router can transmit an ARP request throughout the network that asks a host having the network layer address to supply its data link layer address in a return message. Only the addressed destination host responds, and the router is then able to insert the correct data link layer address into the message being forwarded, and to transmit the message to its final destination.

IP routing specifies that IP datagrams travel through inter-networks one hop at a time (next hop routing) based on the destination address in the IP header. The entire route is not known at the outset of the journey. Instead, at each stop, the next destination (or next hop) is calculated by matching the destination address within the datagram's IP header with an entry in the current node's (typically but not always a router) routing table.

Each node's involvement in the routing process consists only of forwarding packets based on internal information resident in the router, regardless of whether the packets get to their final destination. IP routing does not alter the original datagram; the datagram source and destination addresses remain unaltered. The IP header always specifies the IP address of the original source and the IP address of the ultimate destination.

When IP executes the routing algorithm it computes a new address, the IP address of the machine/router to which the datagram should be sent next. This algorithm uses the information from the routing table entries, as well as any cached information local to the router. This new address is most likely the address of another router/gateway. If the datagram can be delivered directly (the destination network is directly attached to the current host) the new address will be the same as the destination address in the IP header. Reference is made to the above identified copending patent application Ser. No. 08/753,198 filed Nov. 21, 1996 for a further detailed description of routers with respect to IP protocol functionality.

A simplified diagram of the Internet is depicted in FIG. 1. The Internet 50 comprises Autonomous Systems (AS) which may be owned and operated by Internet Service Providers (ISPs) such as PSI, UUNET, MCI, SPRINT, etc. Three such AS/ISPs are shown in FIG. 1 at 52, 54 and 56. The Autonomous Systems (ASs) are linked by Inter-AS Connections 58, 60 and 62. Information Providers (IPs) 64 and 66, such as America Online (AOL) and Compuserve, are connected to the Internet via high speed lines 68 and 70, such as T1/T3 and the like. Information Providers generally do not have their own Internet based Autonomous Systems but have or use Dial-Up Networks such as SprintNet (X.25), DATAPAC and TYMNET.

By way of current illustration, MCI is both an ISP and an IP, Sprint is an ISP, and MicroSoft (MSN) is an IP using UUNET as an ISP. Other information providers, such as universities, are indicated in exemplary fashion at 72 and are connected to the AS/ISPs via the same type connections, here illustrated as T1 lines 74. Corporate Local Area Networks (LANs), such as those illustrated at 76 and 78, are connected through routers 80 and 82 and links shown as T1 lines 84 and 86. Laptop or PC computers 88 and 90 are representative of computers connected to the Internet via the public switched telephone network (PSTN), shown connected to the AS/ISPs via dial up links 92 and 96.

The Information Providers (IPs) are end systems that collect and market the information through their own servers. Access providers are companies such as UUNET, PSI, MCI and SPRINT which transport the information. Such companies market the usage of their networks.

Thus, in simplified fashion the Internet may be viewed as a series of gateway routers connected together with computers connected to the routers. In the addressing scheme of the Internet an address comprises four numbers separated by dots. An example would be 164.109.211.237. Each machine on the Internet has a unique number that includes one of these four numbers. In the address, the leftmost number is the highest number. By analogy this would correspond to the ZIP code in a mailing address. The first two numbers that constitute this portion of the address may indicate a network or a locale. That network is connected to the last router in the transport path. In differentiating between two computers in the same destination network only the last number field changes. In such an example the next number field 211 identifies the destination router. When the packet bearing the destination address leaves the source router it examines the first two numbers in a matrix table to determine how many hops are the minimum to get to the destination. It then sends the packet to the next router as determined from that table and the procedure is repeated. Each router has a database table that finds the information automatically. This process continues until the packet arrives at the destination computer. The separate packets that constitute a message may not travel the same path, depending on traffic load. However, they all reach the same destination and are assembled in their original sequence order in a connectionless fashion. This is in contrast to connection oriented modes such as frame relay and ATM or voice.

Connection-oriented network services require that users establish a single distinct virtual circuit before the data can be transmitted. This circuit then defines a fixed path through the network that all traffic follows during the session. Several packet switching services are connection-oriented, notably X.25 and Frame Relay. X.25 is the slower of the services, but has built-in error correction—enough for its performance not to depend on clean, high-quality optical fiber lines. Frame relay, regarded as the first generation of fast packet technology, is well-suited for high-speed bursty data communication applications.

Connectionless network services, by contrast, let each packet of a communications session take a different, independent path through the network. One example is the Switched Multimegabit Data Service (SMDS), a possible precursor to broadband ISDN. This fast-packet service supports data rates ranging from the T1 rate of 1.544 Mb/s up to 1 Gb/s. The SMDS transport system architecture is defined by IEEE 802.6 Metropolitan Area Network standards.

Software has recently been developed for use on personal computers to permit two-way transfer of real-time voice information via an Internet data link between two personal computers. In one of the directions, the sending computer converts voice signals from analog to digital format. The software facilitates data compression down to a rate compatible with modem communication via a POTS telephone line. The software also facilitates encapsulation of the digitized and compressed voice data into the TCP/IP protocol, with appropriate addressing to permit communication via the Internet. At the receiving end, the computer and software reverse the process to recover the analog voice information for presentation to the other party. Such programs permit telephone-like communication between Internet users registered with Internet Phone Servers. The book "Mastering the Internet", Glee Cady and Pat McGregor, SYBEX Inc., Alameda, Calif., 1994, ISBN 94-69309, very briefly describes three proprietary programs said to provide real-time video and voice communications via the Internet.

The commonly assigned application Ser. Nos. 08/634,543 and 08/670,908, identified more particularly above, are concerned with providing telephone service via the Internet to users of the public telecommunications network who may not have access to a computer or separate telephone access to the Internet. Such service would be economical, especially for long distance calls, compared with the toll rates charged by long distance interexchange carriers.

The routing of real time voice telephone calls through a wide area data internetwork, such as the Internet, presents challenges to telephone company service providers with respect to providing all of the enhanced services that are currently available for calls that are routed entirely through the traditional public switched telephone network. One group of such services is based in the use of calling party identification.

For example, the caller ID service, with its various enhancements, is a telephone on-hook capability that provides a called party with information about the caller before the incoming call is answered. Conventionally, such information includes the date and time of the call and the caller's telephone number. Expanded versions provide additional information. A data message, preceded by a channel seizure signal, is sent in conjunction with the ringing signal from the central office to the called party during the silent interval after the first 20-Hz, 2-second ringing phase. To perform these functions, the central office must have available the calling party information.

Other services involve various subscriber options to a called party who has not answered a call by reason, for example, of the line being in a busy condition at the time of the call or there being no answer by the called party. By later dialing a particular code of DTMF keys, a party at the called subscriber line station may obtain the identity of the last caller or may have the number of the last caller automatically dialed (known as "return call"). These services also require that the calling party identification information for the last call be available to the central office. The term "caller ID services," as used hereinafter throughout this disclosure is intended to refer to these various services, briefly described above.

A problem with earlier proposed voice Internet service systems is the inability to provide the destination public switched telephone network the appropriate caller identification information inasmuch as calls are routed from an external network to the destination public switched telephone network. With current implementations, a gateway router, i.e., the node in the Internet that initiates connection of a call to the destination PSTN, would be identified as the calling party source. Caller information identification services would not provide actual caller information under these conditions; instead, the called party would be subject to receiving useless information. In the return call service example, dialing of the appropriate code would result in a call placed to the gateway router as a final destination. The purpose of return call, of course, is to establish connection to the last caller, by whatever communication path, not necessarily to establish connection with the Internet.

BRIEF SUMMARY OF THE INVENTION

The present invention overcomes the above noted drawbacks of earlier proposed systems and provides additional advantages in part by providing the actual directory number of a calling party in the information conveyed throughout the course of set up of a voice call through a data network.

An advantage of the present invention is the use, in routing a voice call, of common channel signalling to provide data identifying a calling subscriber line from a calling PSTN, which information can then be transported through a separate data internetwork to the destination PSTN, at which the data is then extracted and sent to the called subscriber line while completing routing of the call. A route for the call is established at gateways connected to the data internetwork at the interface points with the calling and destination PSTNs, calling subscriber line information and dialed digit information being conveyed to the gateways. The destination end gateway initiates a call connection to the called subscriber line via the destination PSTN to complete routing of the call, while supplying identification of the calling subscriber line in a form recognized as such by the called PSTN. The called party central office can then provide caller ID services.

A further advantage of the present invention is the use of a gateway server connectable to the data internetwork to interface with the destination PSTN through a connection recognizable by the PSTN. Calling party identification conveyed through this connection can be distinguished by the receiving PSTN from data identifying the gateway.

Additional advantages of the present invention will become readily apparent to those skilled in this art from the following detailed description, wherein only the preferred embodiment of the invention is shown and described, simply by way of illustration of the best mode contemplated for carrying out the invention. As will be realized, the invention is capable of other and different embodiments, and its several details are capable of modifications in various obvious respects, all without departing from the invention. Accordingly, the drawings, throughout the various figures of which like elements are depicted by the same reference numerals, and description are to be regarded as illustrative in nature, and not as restrictive.

DETAILED DESCRIPTION OF THE INVENTION

Figure 1:
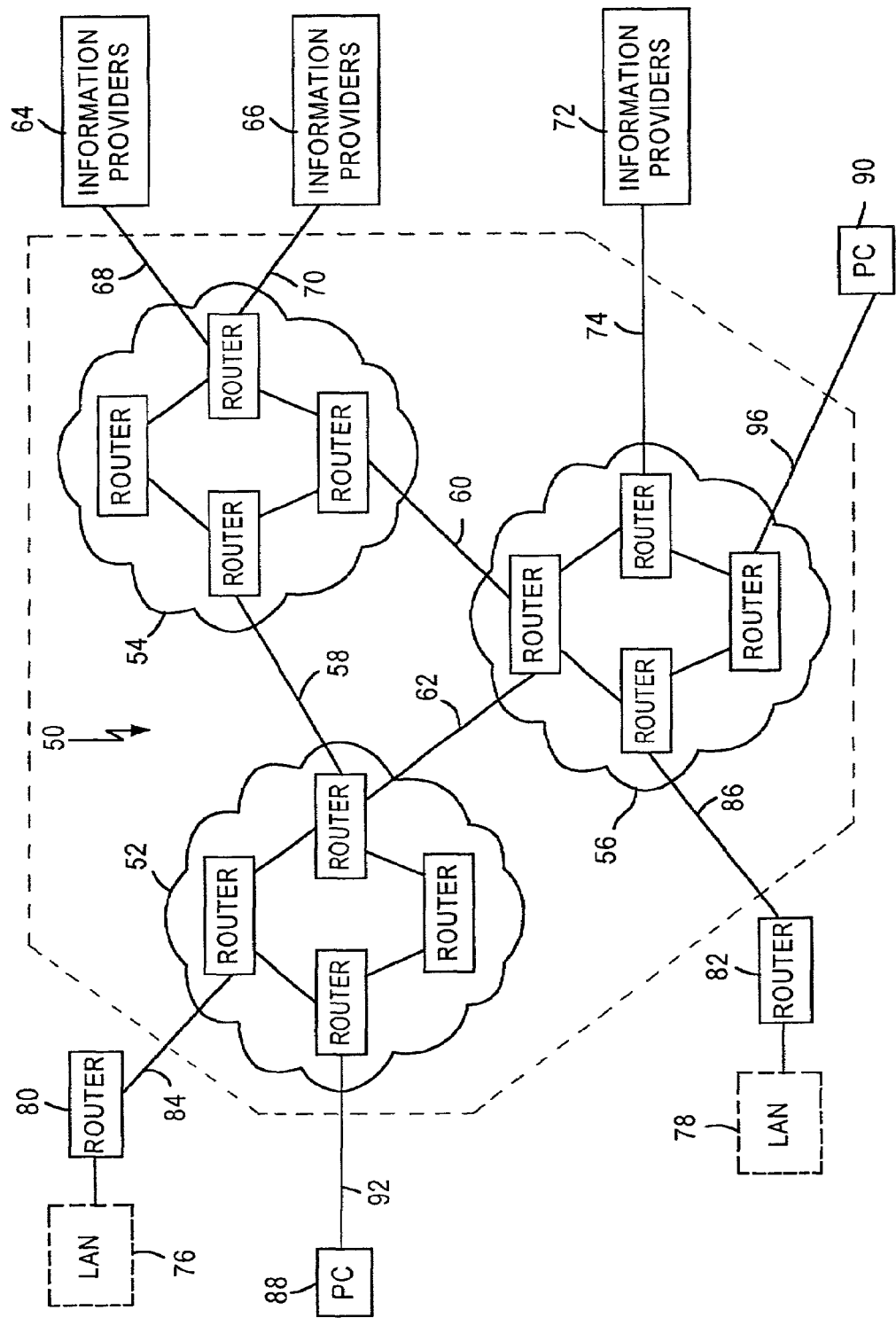
FIG. 1 is a simplified diagram of the Internet.
Figure 2:
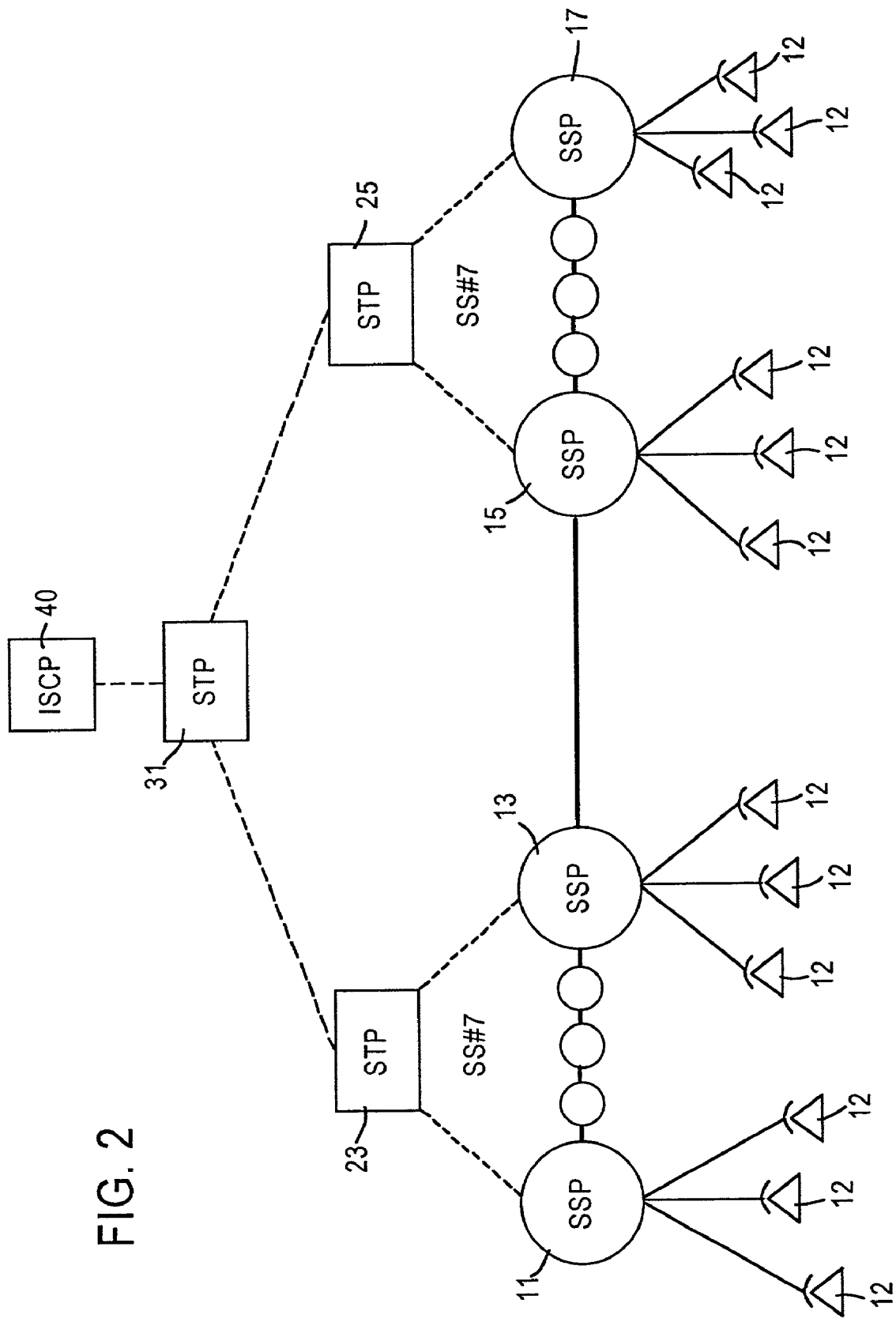
FIG. 2 is a simplified block diagram of a Public Switched Telephone Network (PSTN) that comprises a Common Channel Interoffice Signaling (CCIS) system and voice communication network that perform as an Advanced Intelligent Network (AIN) system.

FIG. 2 is a depiction of the architectural environment of a switched telephone network that is considerably simplified for explanation purposes. The full network and operating environment for a PSTN comprises multiple central offices, diverse interconnections, and provisions for reliability through redundancy, all of which need not be shown for developing an understanding of the invention. Service Switching Points (SSPs) 11, 13, 15, 17 represent central office (CO) switching systems that are appropriately equipped programmable switches present in the telephone network. Subscriber lines individually connect SSPs to subscriber premises at which locations telephones 12 or other communication devices are connected. In the well known Advanced Intelligent Network (AIN), the SSPs recognize AIN type calls, launch queries to the ISCP and receive commands and data from the ISCP to further process the AIN calls. In the illustrated embodiment, the CO-SSPs are end offices.

SSP capable central office switching systems typically contain a programmable digital switch with CCIS communications capabilities. One example of an SSP capable CO switch is a 5ESS type switch manufactured by AT&T. Other vendors, such as Northern Telecom and Seimens, manufacture comparable digital switches that may serve as the SSPs. A more detailed description of an exemplary SSP type CO is presented in the commonly assigned copending application Ser. No. 08/248,980, filed May 25, 1994, hereby incorporated by reference herein.

The SSP type COs 11 and 13 are shown connected to a first local area STP 23, SSP-COs 15 and 17 being connected to a second local area STP 25. The connections to the STPs are for signalling purposes. The control part of SS7 protocol is known as Integrated Services Digital Network User Part (ISUP). ISUP determines the procedures for setting up, coordinating, and taking down trunk calls on the SS7 network.

Signaling between switching offices is required for transmitting routing and destination information, for transmitting alerting messages such as to indicate the arrival of an incoming call, and for transmitting supervisor information, e.g. relating to line status. Signaling between offices can use 'in-band' transport or 'out-of-band' transport.

In-band signaling utilizes the same channel that carries the communications of the parties. In a voice telephone system, for example, one of the common forms of in-band signaling between offices utilizes multi-frequency signaling over voice trunk circuits. The same voice trunk circuits also carry the actual voice traffic between switching offices. In-band signaling, however, tends to be relatively slow and ties up full voice channels during the signaling operations. In telephone call processing, a substantial percentage of all calls go unanswered because the destination station is busy. For in-band signaling, the trunk to the end office switching system serving the destination is set-up and maintained for the duration of signaling until that office informs the originating office of the busy line condition. Thus, in-band signaling greatly increases congestion on the voice traffic channels. In-band signaling also is highly susceptible to fraud by hackers who have developed devices that mimic in-band signaling.

Out-of-band signaling has evolved to mitigate the above-described problems. Out-of-band signaling utilizes separate channels, and in many cases separate switching elements. Congestion on the channels carrying the actual communication traffic is thereby considerably reduced. Unauthorized simulation of signaling messages which ride on an out-of-band channel or network is virtually impossible. As out-of-band signaling utilizes its own signal formats and protocols, unconstrained by protocols and formats used for the actual communication, out-of-band signaling typically is considerably faster than in-band signaling.

Out-of-band signaling networks typically include data links and one or more packet switching systems. Out-of-band signaling for telephone networks is often referred to as Common Channel Signaling (CCS) or Common Channel Interoffice Signaling (CCIS). Most such signaling communications for telephone networks utilize signaling system 7 (SS7) protocol. An SS7 compliant CCIS network, such as illustrated in FIG. 2, comprises data Signal Transfer Points (STPs) and data links between the STPs and various telephone switching offices of the network. The STPs are program controlled packet data switching systems. In normal call processing operation, an STP will receive a packet data message from another node of the network, for example from an end office switching system. The STP analyzes point code information in the packet and routes the packet according to a translation table stored within the STP. This translation table is static. Any packet having a particular point code is output on a port going to the next CCIS signaling node specified by translation of that point code. For a more detailed description of the makeup of SS7 messages and their specific component purposes, reference is made to commonly assigned copending application Ser. No. 08/753,198 filed Nov. 21, 1996, identified above.

Each local area STP can connect to a large number of the SSP-COs, as indicated for ease of illustration merely by the circles below STPs 23 and 25. The central office SSPs are interconnected to each other by trunk circuits for carrying telephone services. The overall network may contain end offices without SSP functionality. Such end offices will forward calls to one of the SSPs if such treatment is required. Also, certain switching offices within the network, whether SSPs or not, may function primarily as tandem type offices providing connections between trunk circuits only.

The local area STPs 23 and 25, and any number of other such local area STPs (not shown) communicate with a state or regional STP 31. The state or regional STP 31 in turn provides communications with the ISCP 40. The STP hierarchy can be expanded or contracted to as many levels as needed to serve any size area covered by the Advanced Intelligent Network (AIN) and to service any number of stations and central office switches. Also, certain switching offices within the network, whether SSPs or not, may function primarily as tandem type offices providing connections between trunk circuits only. The links between the central office switching systems and the local area STPs 23 and 25 are typically SS#7 type CCIS interoffice data communication channels. The local area STPs are in turn connected to each other and to the regional STP 31 via a packet switched network. The regional STP 31 also communicates with the ISCP 40 via a packet switched network.

The network shown in FIG. 2, for purposes of explanation of the present invention, may be considered to be one PSTN or a combination of a plurality of PSTNs, depending upon the extent of the geographical area serviced. The networks shown may serve different regions of the country and be operated by different local exchange carriers. Alternatively, one network may be a local exchange carrier network, and another network may comprise an interexchange carrier network.

Figure 3:
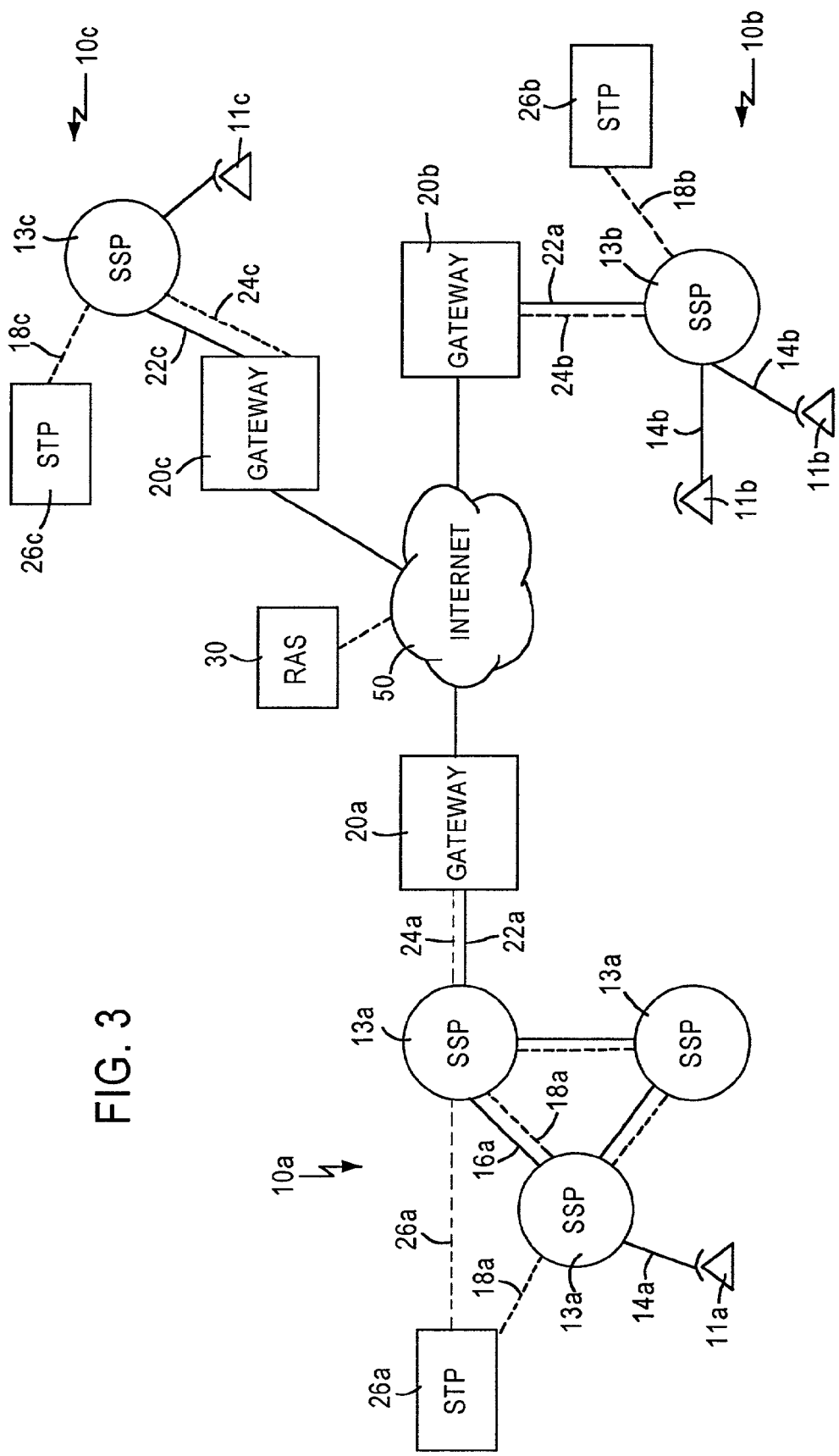
FIG. 3 is a simplified block diagram illustrating the architecture of a telecommunications system using a wide area packet switched network such as the Internet, in combination with a plurality of PSTNs as used in the present invention.

FIG. 3 is a block diagram illustrating the architecture of a telecommunications system using a wide area packet switched network such as the Internet, in combination with a plurality of PSTNs as used in the present invention. PSTNs 10*a*, 10*b*, and 10*c* may be considered to be operating in different geographical regions. For example, each network may be a public switched telephone network such as a Regional Bell Operating Company (RBOC), or a private communication network having a limited service area. Each network has at least one assigned number code, such as an area code, that uniquely identifies service areas of that network. Each network also includes a plurality of interconnected switching systems 13 serving customer premises terminals 11 via local loop connections 14. Each network 10 also includes trunk lines 16 and signaling lines 18 that support the interoffice signaling for the particular network.

Each telephone system also includes a gateway 20 that functions as an Internet telephony server, providing an interface between the corresponding telephone system 10 and the Internet. It is to be understood that the use of the terms Internet and data internetwork and the like are all used interchangeably herein to denote a wide area packet switched network that may comprise interconnected subnetworks. Similarly the term "gateway" may be variously described as an Internet module or interface, gateway server, or gateway router. The gateway 20 is typically connected to a local central office 13 via a standard voice grade line or trunk connection 22, for example a T-1 or T-3 connection. Alternatively the hardware associated with the gateway 20 may be situated at the central office 13 and associated with the switching system.

The gateways 20 include signaling capabilities, for example SSP capabilities, and are connected into the CCIS network as indicated by the links 24 to the illustrative STP 26. The SSPs serving the corresponding gateway 20 are interconnected with the central office SSPs and CCIS network. The gateways may be linked to the networks for signaling purposes by conventional F links. As an alternative to the illustrated arrangement, the gateways may be directly linked to the STPs. The gateways are connected to the Internet by T1/T3 trunks 26.

A routing and administration server (RAS) 30, linked to the Internet, includes a routing and administration database for managing call routing translations and user access permissions. The RAS 30 is shown as an Internet node having a dedicated virtual path 32. The routing and administration database stores records for every area code/NNX served by a telephony system 10, along with the network address for the corresponding gateway 20.

Figure 4:
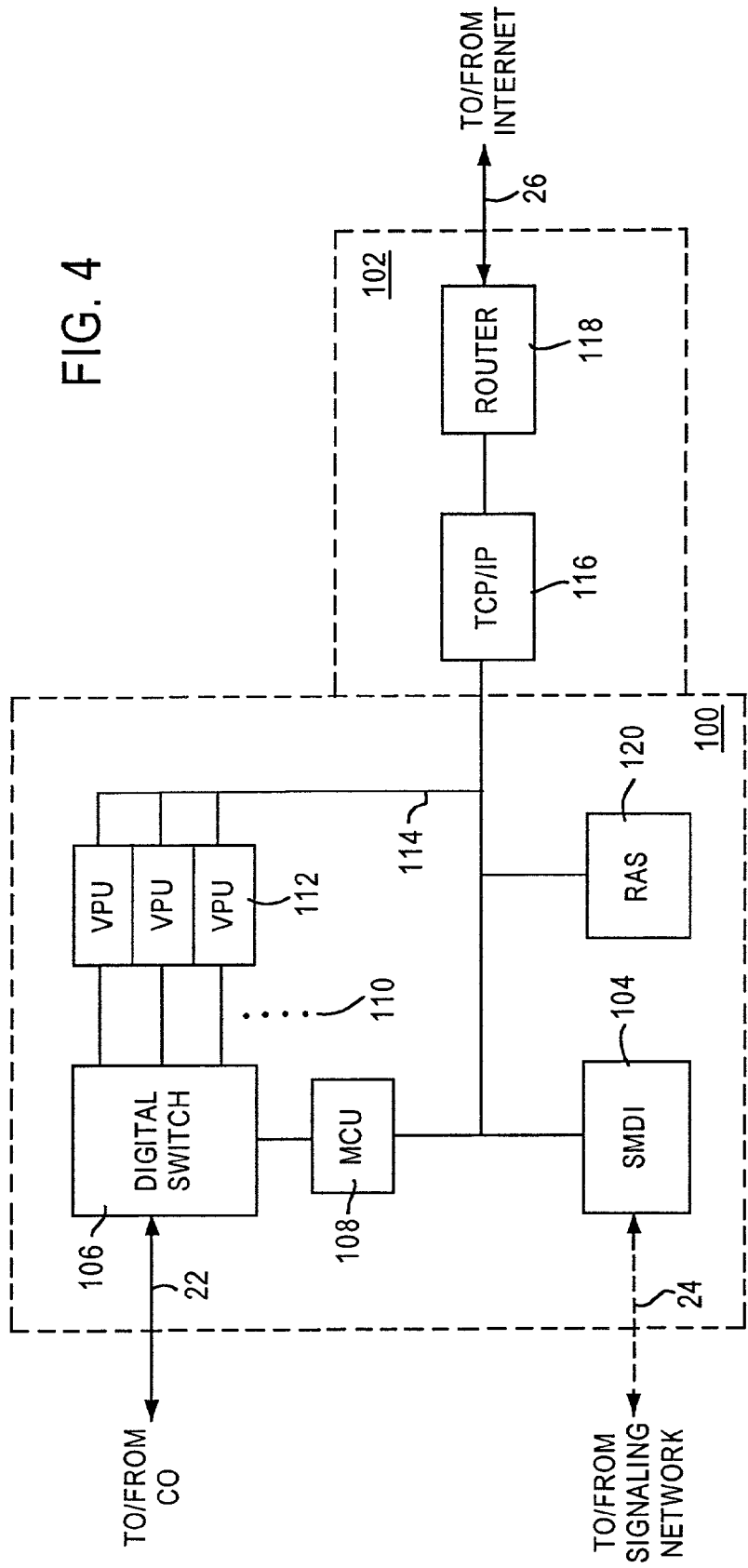
FIG. 4 is a block diagram of a preferred embodiment of a gateway 20 of FIG. 3.

FIG. 4 is a block diagram of a preferred embodiment of a gateway 20 of FIG. 3. The gateway comprises a telephony platform 100 and an Internet server platform 102. The telephony platform 100 performs basic telephony functions, including incoming call detection (ringing, trunk seizure, etc.), call supervision/progress detection (busy tone, disconnect, connect, recorded announcement, dialtone, speech, etc.), call origination, DTMF, call termination, call disconnect, switch hook flash, etc.

The telephony platform includes a simplified message desk interface (SMDI) 104 that sends and receives signaling data to the CCS signaling network, a digital switch 106 that sends and receives communication traffic from the trunk line 22, a master control unit (MCU) 108 that controls the overall operations of the gateway, including controlling the switch 106 to separate data traffic on the trunk line 26 into single 64 kb/s data channels 110. The data on each of the data channels 110 is compressed by a voice processor unit (VPU) 112 into compressed communication data having a data rate of approximately 16 kbit/s or lower. The compressed communication data may be either voice data or other data, for example facsimile data.

The compressed communication data is output to a local area network (LAN) 114, for example an Ethernet-based network at 100 Mbit/s. The LAN 114 carries data signals between the MCU 108 and the voice processing units 112. The system also includes T1 type digitized audio links 110 between the switch 106 and each of the VPU's 112. The LAN 114 transports data packets to a packet assembler/disassembler (PAD) 116 that packetizes data on the LAN 114 into TCP/IP packets for transport onto the Internet. The PAD 116 also recovers signaling and communication data from data packets received by the router 118. Hence, the PAD 116 receives signaling information from the SMDI 104 originated from the signaling network, and outputs signaling data recovered from data packets received from the Internet to the SMDI 104 for subsequent call processing via the signaling links 24.

The gateway also may include an RAS database 120 that is an image of the database in the RAS server 30. The RAS database 120 enables translation information to be obtained without accessing the RAS 30 via the Internet. In this arrangement, the gateway would monitor its own bandwidth allocation as stored in the RAS database 120. The router 118 is of the type now generally used in Internet practice. Although not shown for purposes of explanation of the present invention, the router 118 may also be connected to a Domain Name Service (DNS) server and a Dynamic Host Configuration Protocol (DHCP) server of the type conventionally used by Internet Service Providers in existing Internet Service.

Figure 5A:
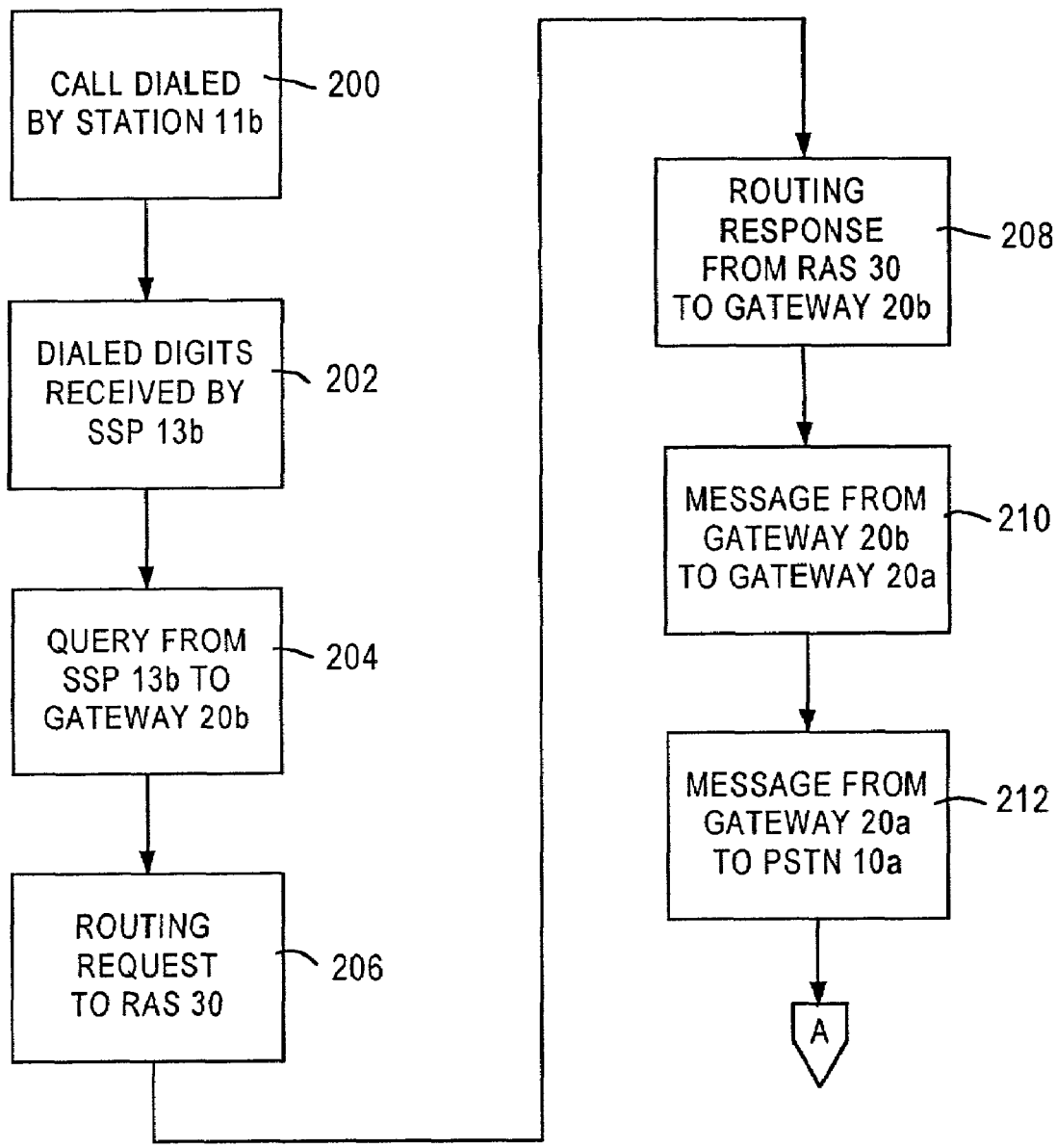
FIGS. 5a and 5b, taken together, form a flow diagram exemplifying processing of a call routed through the architecture illustrated in FIGS. 3 and 4 according to the present invention.
Figure 5B:
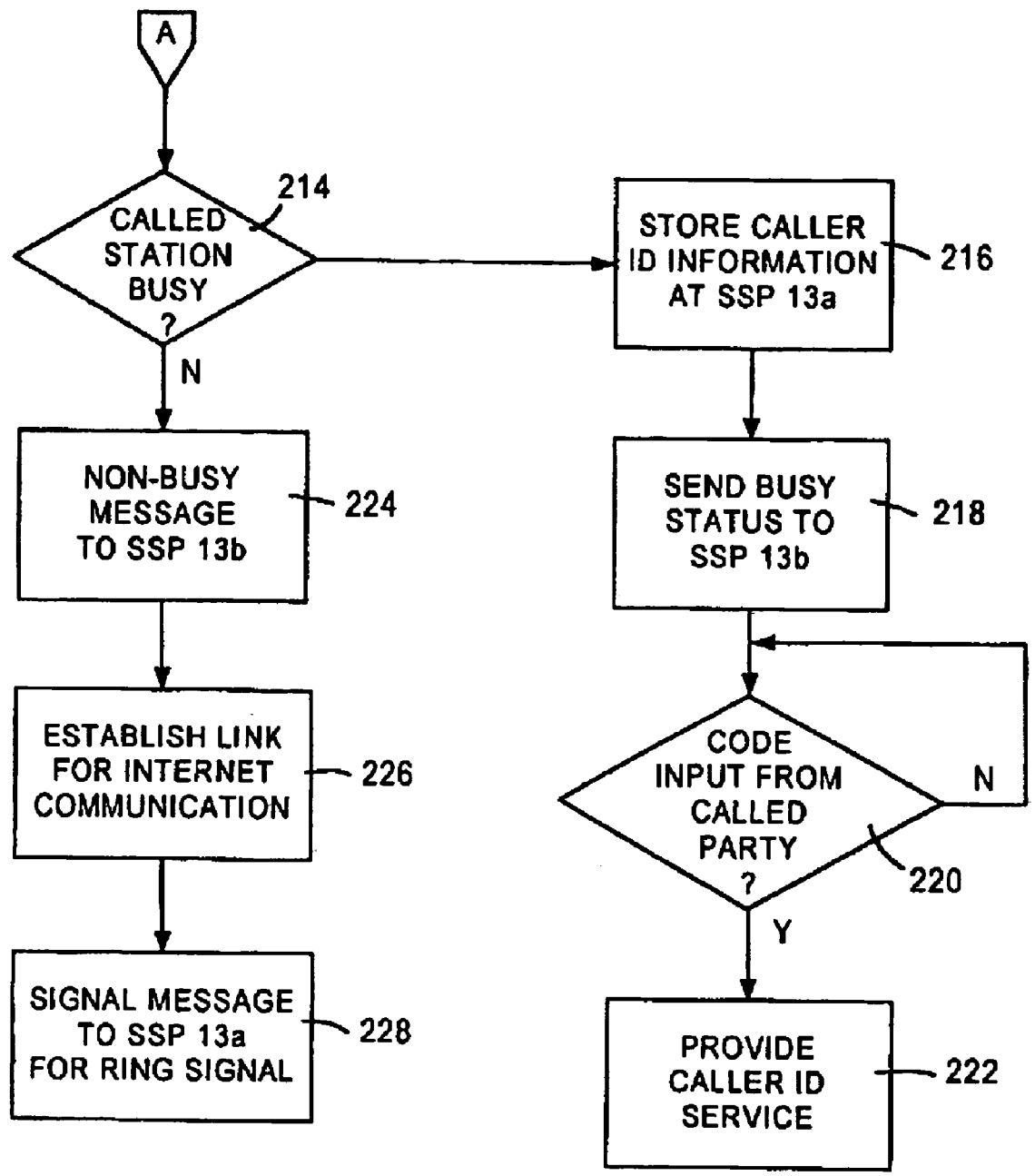

FIGS. 5a and 5b, taken together, form a flow diagram exemplifying processing of a call routed through the architecture illustrated in FIGS. 3 and 4 according to the present invention. In this example a calling party at a station 11b, served by PSTN 10b, is assumed to put the telephone off hook to place the call to a called party at station 11a, served by PSTN 10a, at step 200. The caller may indicate a request for an "Internet call" by dialing a code *82, which prefix has been predesignated by a program at the PSTN central office for this purpose. The dialing of the prefix *82 is followed by the dialing of the directory number of the called party station, including the area code. It is to be recognized that Internet calls may also be initiated in other ways, such as under control of the AIN network. For example, the ISCP would determine whether a call is to be routed through the Internet in response to a trigger from the originating central office to access stored criteria for the calling party in an associated CPR in the ISCP.

In the current example, the central office switching system responds to the off-hook and receives the dialed digits from the calling station in step 202. The central office switching system analyzes the received digits and determines from the prefix *82 that the call is an Internet call. Responsive to its programmed recognition of the prefix code, the originating central office 13b suspends the call and sends a CCIS query message in step 204 to the gateway 20b via the signaling channel 24b.

In response to the query message, the gateway 20b identifies the Internet telephony server (gateway 20a) servicing the called party 11a by sending, in step 206, a routing request, including the number of the calling party 11b and the area code of the called party 11a, to the RAS 30 via the Internet. Alternatively, the gateway 20b may access its own internal routing and administration database 120. The RAS data base accesses its internal translation tables and sends a routing response in step 208. The routing response includes the identity (e.g., IP address) of the gateway 20a serving the called party 11a, the predetermined virtual path between the two servers, and any other pertinent information, such as the minimum guaranteed service level for the calling station 11b. The gateway 20b then sends, in step 210, a signaling message through the Internet in the form of a query message packetized in TCP/IP packets having the IP address of the gateway 20a as the destination address. The signaling packets, which include a session ID, the called number, and the directory number of the calling station 11b, are received by the gateway 20a.

At step 212, the gateway 20a recovers the query message from the payload of the TCP/IP packets and formulates an SS7 signaling message, to be conveyed through the common channel signaling network of PSTN 10a, to set up completion of the call routing to station 11a. Station 11a in this example is shown to be a subscriber of a central office SSP 13a that is not directly connected to the gateway 20a. Routing of the call through PSTN 10a is set up through STP 26a in the common channel signaling network. If the called station instead were to have been a subscriber of the central office to which the gateway is directly connected, signaling through the STP is, of course, unnecessary. In either case, the initial SSP in the PSTN that receives the signaling message extracts caller identification information.

In the absence of provision to the contrary, as in the present invention, an originating switching office normally identifies calling party data by correlating the subscriber line connection at the switch with stored information associated with the subscriber. This data is sent in the SS7 signaling message to the terminating switching office (which may also be the originating switching office). The terminating switching office is then enabled to provide caller ID based services to the called party subscriber. In the Internet call architecture shown in FIG. 3, the voice path of the incoming call between PSTN 10a is connection 22a to digital switch 106 in gateway 20a, while the messaging signal path 24a connects the PSTN with SMDI 104 in the gateway. With conventional call processing methods, the receiving SSP 13a either would misinterpret the identity of the calling party to be the gateway or be unable to provide caller ID information.

To overcome this problem with the prior art, in the present invention SSP 13a is programmed to recognize the voice path connection 22a as a special status condition upon receipt of a signaling message associated with that connection. To obtain originating caller identification information, the switch looks to the message data content of incoming signaling packets for the gateway connection 22a instead of the header address portion of received packets. Signaling messages received at switch ports connected to PSTN locations would be identified by the switch as to caller origination in the conventional manner.

In accordance with the present invention, as an alternative to the arrangement shown in FIG. 3, connections between the gateway 20a and SSP 13a may be replaced by an ISDN connection. With an ISDN link, a separate channel for signaling purposes would be provided. As a further alternative, particularly for PSTN systems that do not include a CCIS network, a feature group D trunk can be connected between the gateway and the SSP. Feature group D protocol provides in-band signaling. In all of these alternatives of the invention, the switch at the incoming SSP is programmed to obtain the originating caller identification information by recognizing the connection to the gateway to extract the appropriate data from the signaling messages.

At step 214, the SSP 13a in PSTN 10a connected to the gateway initiates SS7 signaling to determine whether called station 11a is busy. If the called station is busy, the destination central office SSP 13a so informs the gateway via the CCIS signaling network, while temporarily storing the caller ID information. This information is available for later use in caller ID services such as return call or last caller identification. The busy status is sent in a signaling message back through the Internet to gateway 20b, whereupon a busy signal is provided by PSTN 10b to the calling station 11b in conventional manner. At step 220, determination is made of whether the called station has entered an appropriate code for such services. If so, the corresponding service is provided in conventional manner at step 222.

If the called station is not busy, the destination SSP 13a busies out the called station line 14a by blocking all calls. A signaling message is then sent, via the CCIS network in PSTN 10a, the gateways 20a and 20b and the Internet, to the CCIS network in PSTN 20b to indicate that the called line is available and waiting, at step 224. At step 226, an Internet communication path is established for the call in the manner described more fully in copending application Ser. No. 08/753,198 filed Nov. 21, 1996, identified previously. At step 228, a signaling message is sent through the common channel signaling network of PSTN 10a to the terminating SSP 13a to complete the call routing and ring the called station 11a. The caller ID information obtained from the message is used to provide the caller ID service information between ring signals in the conventional manner.

Only the preferred embodiments of the invention and but a few examples of its versatility are shown and described in the present disclosure. It is to be understood that the invention is capable of use in various other combinations and environments and is capable of changes or modifications within the scope of the inventive concept as expressed herein.

We claim:

1. A gateway for use in a telecommunications system having a plurality of diverse paths available for transporting a voice call, one of said paths traversing at least a public switched telephone network (PSTN) having a local line to a subscriber receiving the voice call and a packet-switched data communication network, the gateway being connectable between the packet-switched data communication network and the PSTN, the gateway comprising:

(a) a data network server connectable to the packet-switched data communication network, for receiving through the packet-switched data communication network a request from a calling party to set up a voice call through the PSTN to the local line to the subscriber, and for receiving identification information associated with the calling party through the packet-switched data communication network; and (b) a telephony platform having a call connection to the PSTN for initiating the voice call through the PSTN to the local line to the subscriber in response to the request from the calling party and having a signaling link for providing call-related signaling information to the PSTN including the identification information associated with the calling party, to enable transport of the calling party identification information through the PSTN to the local line to the subscriber;

wherein the call connection and the signaling link utilize a Feature Group D trunk between the telephony platform and the PSTN.

2. A method for providing caller identification information for a voice call, originating from a remote calling subscriber device, to a called telephone subscriber line comprising the steps of:

routing an initial voice call, originated by a calling party at the remote calling subscriber device, through a packet switched data network to a gateway that interfaces between the packet switched data network and a public switched telephone network (PSTN);

in response to said routing step, placing a subsequent telephone call from the gateway through the PSTN to the called subscriber line;

linking the initial voice call at the gateway with the subsequent telephone call; and transporting originating calling party identification information from the gateway through the PSTN to the called subscriber line while the called subscriber line is in an on-hook condition.

3. The method of claim 2, wherein the step of routing the initial voice call comprises:
routing a telephone call from the remote calling subscriber device through a remote public-switched telephone network (PSTN) to a remote gateway coupled between the packet-switched data network and the remote PSTN; and establishing communications relating to the initial voice call between the gateway and the remote gateway via the public switched data network.

4. The method of claim 3 wherein:
the step of establishing communications comprises communicating from the remote gateway an identification of a line of the remote PSTN for the remote calling subscriber device; and
the step of transporting originating calling party identification information is responsive to the identification of the line of the remote PSTN.

5. A method for providing caller identification information for a voice call, originating from a remote calling subscriber device, to a called telephone subscriber line comprising the steps of:
receiving a voice call intended for the called telephone subscriber line, originated by a calling party at the remote calling subscriber device through a packet switched data network, handed-off from a gateway that interfaces between the packet switched data network and a public switched telephone network (PSTN);
initiating routing of a telephone call through the PSTN to the called telephone subscriber line for use in competing the voice call to the called telephone subscriber line;
receiving a signaling message containing originating caller identification information from the gateway; and
transporting the originating caller identification information through the PSTN to the called telephone subscriber line while routing the telephone call through the PSTN;
wherein the step of receiving the signaling message comprises receiving the originating caller identification information over a Feature Group D trunk from the gateway.

6. A public switched telephone network (PSTN) serving a destination subscriber station, comprising:
a first telephone switching office having at least one link for voice telephone calls and associated signaling to a gateway coupled between the PSTN and a packet switched data network; a second telephone switching office serving a telephone link to the destination subscriber station- and
an interconnection between the first and second telephone switching offices, wherein:
the first telephone switching office recognizes a voice call arriving from the gateway, obtain originating caller identification information from the gateway, and signal the originating caller identification information to the second telephone switching office, and
the second telephone switching office attempts to complete a telephone call over the telephone link to the destination subscriber station for the recognized voice call from the gateway, and to transmit the originating caller identification information over said telephone link.

7. The public switched telephone network (PSTN) as in claim 6, wherein the interconnection between the first and second telephone switching offices includes an out-of-band signaling network coupled between the first and second telephone switching offices, for transporting the signaling there between.

8. The public switched telephone network (PSTN) as in claim 6, wherein the second telephone switching office serves a telephone line connected to the destination subscriber station.

9. A method comprising:
detecting an off-hook condition of a calling station;
subsequent to detecting the off-hook condition, receiving dialed digits from the calling station, the dialed digits indicating a telephone number of a called party;
providing a request to a routing database, the request including at least a portion of the telephone number of the called party;
receiving in response to the request an identity of a gateway to the called party;
sending a first signaling message over a packet-switched data network to the gateway using the identity of the gateway, the first signaling message including the telephone number of the called party and a telephone number of the calling station;
receiving the first signaling message at the gateway;
formulating an SS7 signaling message in response to the first signaling message, the SS7 signaling message including the telephone number of the calling station;
sending the SS7 signaling message from the gateway over a connection to a public switched telephone network (PSTN) system.

10. The method of claim 9, wherein the request includes the telephone number of the calling station.

11. The method of claim 9, wherein the at least a portion of the telephone number of the called party includes an area code of the called party.

12. The method of claim 9, wherein the routing database stores records associating telephone number information with network addresses for corresponding gateways.

13. The method of claim 9, wherein the first signaling message includes a session ID.

14. The method of claim 9, wherein the identity of the gateway is an IP address of the gateway.

15. The method of claim 9, further comprising:
receiving a minimum guaranteed service level for the calling station.

16. The method of claim 9, further comprising:
receiving at the gateway over the connection to the PSTN system an indication that the called party is at least one of busy or available;
when the calling party is indicated busy, sending a second signaling message from the gateway over the packet-switched data network indicating the called party is busy;
when the called party is indicated available, sending a third signaling message form the gateway over the packet-switched network indicating the called party is available.

17. The method of claim 9, wherein the dialed digits further include prefix code indicative of a type of calling.

18. The method of claim 9, further comprising:
translating the at least a portion of the telephone number of the called party into the identity of the gateway using at least one translation table.

19. The method of claim 18 wherein the identity of the gateway includes an IP address of the gateway.

20. The method of claim 9, wherein the connection to the PSTN is a link to a Signal Transfer Point (STP) in the PSTN.

21. The method of claim 9, wherein the connection to the PSTN is a Feature Group D trunk.

22. The method of claim 9, wherein providing the request to the routing database and receiving in response to the request the identity of the gateway to the called party both occur within a single physical device without traversing the packet-switched data network.

23. The method of claim 9, wherein providing the request to the routing database includes sending the request over the packet-switched data network to the routing database, and wherein receiving in response to the request the identity of the gateway to the called party includes receiving a routing response from the routing database over the packet-switched data network, the routing response including the identity of the gateway to the called party.

24. The method of claim 9, wherein the packet-switched data network comprises at least one of wide-area networks, local-area networks, and the Internet.

* * * * *